(12) United States Patent
Sugihara et al.

(10) Patent No.: US 7,243,984 B2
(45) Date of Patent: Jul. 17, 2007

(54) FLOOR PANEL STRUCTURE OF VEHICLE BODY

(75) Inventors: Tsuyoshi Sugihara, Hiroshima (JP); Seiichi Nakabayashi, Hiroshima (JP); Shigefumi Hirabayashi, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 10 days.

(21) Appl. No.: 11/126,149

(22) Filed: May 11, 2005

(65) Prior Publication Data

US 2005/0285432 A1      Dec. 29, 2005

(30) Foreign Application Priority Data

Jun. 23, 2004   (JP) ............................. 2004-185016

(51) Int. Cl.
*B62D 25/20* (2006.01)
(52) U.S. Cl. ................. 296/193.07; 296/204; 296/1.03
(58) Field of Classification Search ................ 296/208, 296/204.1, 193.07, 184.1, 1.03; B62D 25/20
See application file for complete search history.

(56) References Cited

U.S. PATENT DOCUMENTS

| | | | | |
|---|---|---|---|---|
| 1,624,903 A | * | 4/1927 | Wetzel | ........................ 296/204 |
| 2,126,607 A | * | 8/1938 | Boehner | ..................... 280/797 |
| 2,856,226 A | * | 10/1958 | Purdy | ......................... 296/204 |
| 3,638,748 A | * | 2/1972 | Tixier | ......................... 180/232 |
| 4,402,545 A | * | 9/1983 | Utsunomiya et al. | ........ 296/204 |
| 5,540,880 A | * | 7/1996 | Horiki et al. | ................ 264/553 |
| 5,635,562 A | * | 6/1997 | Malcolm | ..................... 525/108 |
| 6,793,276 B2 | * | 9/2004 | Sugihara et al. | ............ 296/204 |
| 7,014,256 B2 | * | 3/2006 | Kamura et al. | ........ 296/193.07 |
| 7,025,412 B2 | * | 4/2006 | Nakamura et al. | ..... 296/193.07 |
| 2004/0239150 A1 | * | 12/2004 | Fukudome et al. | .... 296/193.07 |
| 2005/0040677 A1 | * | 2/2005 | Kamura et al. | ........ 296/193.07 |

FOREIGN PATENT DOCUMENTS

| | | |
|---|---|---|
| DE | 3837231 A1 | 11/1988 |
| DE | 3844145 A1 | 12/1988 |
| EP | 1 281 604 A2 | 2/2003 |
| EP | 1 281 604 A3 | 12/2003 |
| JP | 58218472 | 12/1983 |
| JP | 6-107235 | 4/1994 |
| JP | 2003112092 | 4/2003 |

\* cited by examiner

*Primary Examiner*—Dennis H. Pedder
*Assistant Examiner*—Michael Hernandez
(74) *Attorney, Agent, or Firm*—Nixon Peabody LLP; Donald R. Studebaker

(57) ABSTRACT

In a floor panel structure of a vehicle body in which a floor of an automotive vehicle is formed by a floor panel coupled to a plurality of frame members extending in substantially longitudinal and width directions of the vehicle, there are provided a panel area formed by being enclosed at least by the frame members, a heavy-weight area located at a substantially central portion of the panel area, and a peripheral area located substantially around the heavy-weight area, wherein the heavy-weight area is configured so as to be heavier than the peripheral area. Accordingly, the vibration energy transmitted from the frame members to the floor panel can be reduced and thereby the acoustic emission generated from the floor panel can be reduced.

2 Claims, 13 Drawing Sheets

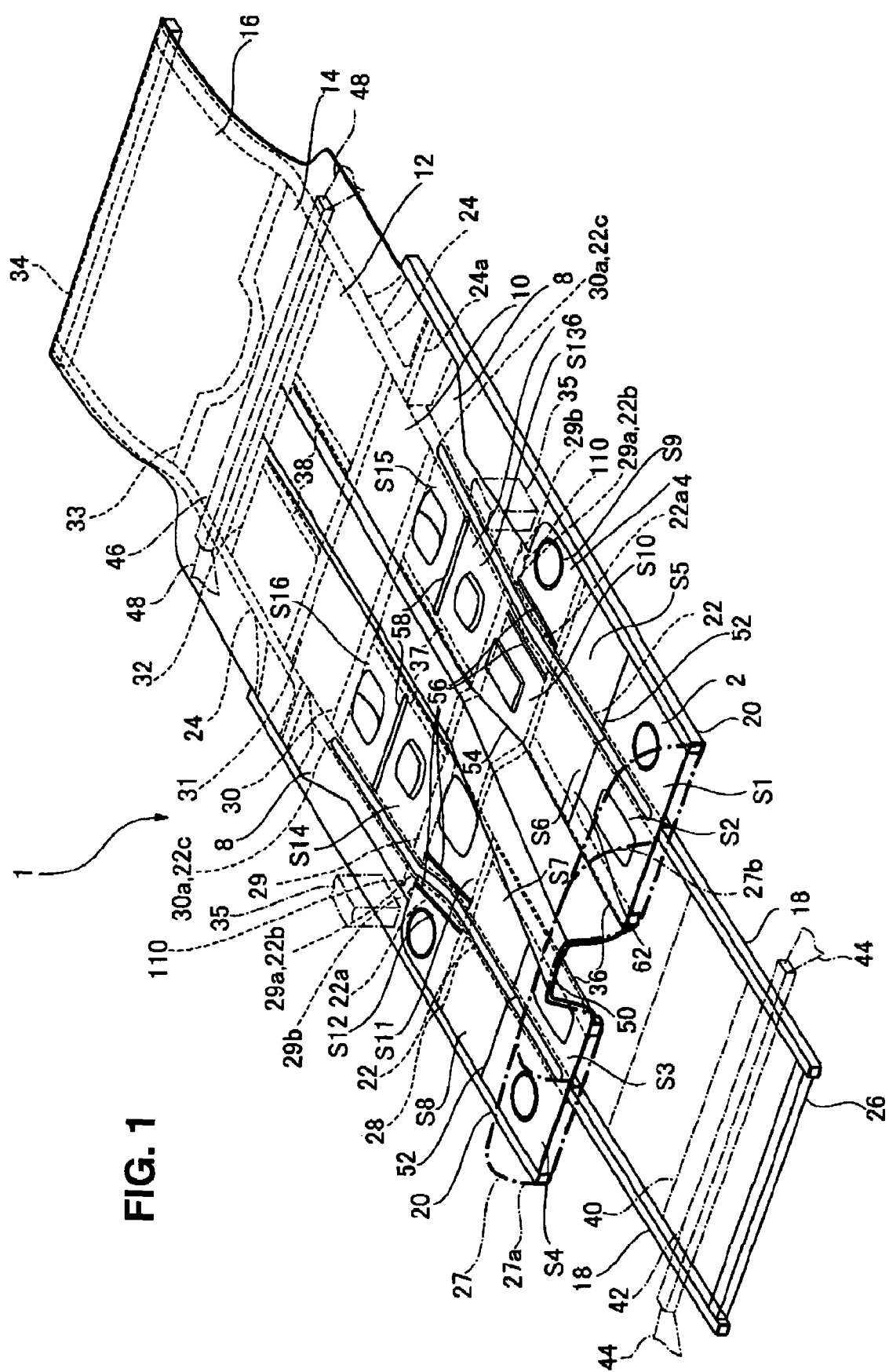

FLOOR PANEL STRUCTURE OF VEHICLE BODY

BACKGROUND OF THE INVENTION

The present invention relates to a floor panel structure of a vehicle body, particularly to a floor panel structure of a vehicle body in which a floor of an automotive vehicle is formed by a floor panel coupled to a plurality of frame members which extend in substantially longitudinal and width directions of the vehicle body.

It is known that vibration from frame members coupled to the engine or the suspension of the vehicle is transmitted to floor panels and makes the floor panels and air in the cabin vibrate, resulting in uncomfortable vibration and noises being generated in the cabin. Herein, the vibration of engine itself and the road noise from the suspension are considered as vibration resources primarily. The road noise is generally caused by resonance of vehicle tires and sympathetic vibration of the suspension.

Conventionally, damping materials or the like which are applied to the floor panels or the particular portions of the vehicle body have been generally used to suppress such vibration and noises. However, a large amount of these materials are generally required, and thereby the weight of the vehicle body tends to increase improperly. This overweight would cause various disadvantages including an issue of costs.

Meanwhile, in view of facts that the frequency of uncomfortable vibration transmitted from the engine and suspension in the automotive vehicle is generally less than 400 Hz and particularly the peak of road noises exists at around 250 Hz which is caused by the resonance of vehicle tires, it is also known that the peculiar frequency of floor panels can be shifted to a high frequency band more than 400 Hz by increasing the rigidity of floor panels with many beads formed at the panels or thicker panels. Namely, the uncomfortable vibration and noises can be suppressed, by preventing the floor panels from vibrating sympathetically with the suspension or the vehicle tires.

In this case, however, the vibration with relatively high frequency tends to increase improperly instead. Accordingly, in order to suppress properly the increased vibration with relatively high frequency at the same time, additional damping materials or the like which should be useful to such vibration with high frequency would be also required. Accordingly, the same problems as described above would occur inevitably.

Meanwhile, Japanese Patent Laid-Open Publication No. 6-107235 discloses a panel structure of a vehicle body in which a panel comprises a plurality of projecting portions with shell structure, which has a proper strength in bending, compressing and tensioning, and recess portions extending between the projecting portions. Herein, the vibration generated could be increased at the recess portions primarily, and the increased vibration could be reduced properly by damping materials provided at the recess portions.

In general, since the exhaust pipe, various auxiliary parts and the like are disposed below or on the floor panel, the above-described projecting portions formed at the floor are required to be disposed with their proper height and location which will not interference with these objects. Further, the height of the projecting portions needs to be set properly so as to provide the passengers with comfortable stepping. Also, those projecting portions need to be formed properly within floor panels enclosed by the frame members. However, in view of these limitations in vehicle-body structure or manufacturing, there exists some cases where the vehicle body panel structure disclosed in the above-described patent publication could not reduce the vibration properly.

SUMMARY OF THE INVENTION

The present invention has been devised in view of the above-described problems of the conventional structure, and an object of the present invention is to provide a floor panel structure of a vehicle body which can reduce properly the vibration energy transmitted from the frame members to the floor panel and thereby reduce the acoustic emission generated from the floor panel.

According to the present invention, there is provided a floor panel structure of a vehicle body, in which a floor of an automotive vehicle is formed by a floor panel coupled to a plurality of frame members which extend in substantially longitudinal and width directions of the vehicle, comprising a panel area provided at the floor panel, the panel area being formed by being enclosed at least by the frame member, a heavy-weight area formed within the panel area, the heavy-weight area being located at a substantially central portion of the panel area, a peripheral area formed within the panel area, the peripheral area being located substantially around the heavy-weight area, wherein the heavy-weight area is configured so as to be heavier than the peripheral area.

According to this structure, since the heavy-weight area being heavier than the peripheral area is formed at the substantially central portion of the panel area, the vibration energy can be properly increased at the peripheral area due to the difference in weight between the heavy-weight area and the peripheral area. The vibration energy greatly and properly increased at the peripheral area is transformed to the heat energy by the damping function of the material which forms the floor panel. As a result, the vibration energy of the panel area can be reduced, and thereby the acoustic emission generated from the panel area can be reduced. Accordingly, regardless of the above-described limitations in the vehicle-body structure, such as height, locations, size and the like, or manufacturing, the vibration energy at the panel area can be reduced effectively by providing the heavy-weight area being heavier than the peripheral area.

According to a preferred embodiment of the present invention, the heavy-weight area comprises a plate which is thicker than that of the peripheral area, whereby the heavy-weight area is configured so as to be heavier than the peripheral area. According to this structure, since the heavy-weight area comprises the plate which is thicker than that of the peripheral area, the weight of the heavy-weight area can be increased easily and properly to provide the difference in weight between the heavy-weight area and the peripheral area. As a result, the vibration energy can be increased surely at the peripheral area, and thereby the vibration can be reduced. Further, since the heavy-weight area with the thicker plate is also increased in its rigidity, the vibration energy can be increased more intensively at the peripheral area by the difference in rigidity between the heavy-weight area and the peripheral area, and thereby the vibration energy can be reduced effectively.

According to another preferred embodiment of the present invention, the heavy-weight area comprises an opening portion which includes a through hole and a plug which is applied so as to close the through hole, and the plug comprises a plate which is thicker than the floor panel comprising the peripheral area. According to this structure, since the heavy-weight area comprises the plug applied to the through hole and the weight of the heavy-weight area is adjustable by controlling the thickness of the plug, the weight of the heavy-weight area can be increased easily and properly, so that the vibration energy can be increased surely at the peripheral area.

According to another preferred embodiment of the present invention, the opening portion further comprises a difference-in-level portion which projects downward, and the through hole is formed at the difference-in-level portion. According to this structure, since the through hole is formed at the difference-in-level portion projecting downward, for example, excessive paints can be easily and properly drained from the through hole in painting manufacturing process of the vehicle.

According to another preferred embodiment of the present invention, the plug includes a peripheral edge projection which projects at a periphery thereof upward or downward. According to this structure, since the rigidity of the plug is increased by the peripheral edge projection, the vibration energy can be increased more intensively at the peripheral area by this difference in rigidity between the heavy-weight area and the peripheral area.

According to another preferred embodiment of the present invention, the plug includes beads which are provided at an upper face thereof. According to this structure, since the rigidity of the plug is increased by the beads, the vibration energy can be increased more intensively at the peripheral area by the difference in rigidity between the heavy-weight area and the peripheral area as well.

According to another preferred embodiment of the present invention, the heavy-weight area comprises a damping material which is provided at the substantially central portion of the panel area, whereby the heavy-weight area is configured so as to be heavier than the peripheral area. According to this structure, since the heavy-weight area is constituted by the damping material provided at the substantially central portion of the panel area, the weight of the heavy-weight area can be easily increased to provide the difference in weight between the heavy-weight area and the peripheral area. As a result, the vibration energy can be increased surely at the peripheral area, and thereby the vibration can be reduced. Also, the vibration energy can be further reduced by the vibration damping function of the damping material itself.

According to another preferred embodiment of the present invention, the damping material comprises an application-type of damping material. According to this structure, since the application-type of damping material has a relatively high hardness and thus its hardness is relatively high, the rigidity of the heavy-weight area can be easily and properly increased. As a result, the vibration energy can be increased more intensively at the peripheral area by the difference in rigidity between the heavy-weight area and the peripheral area and thereby the vibration energy can be reduced effectively.

According to another preferred embodiment of the present invention, the damping material comprises an asphalt-based damping material. According to this structure, since the asphalt-based damping material has a relatively great specific gravity and thus its weight is relatively large, the weight of the heavy-weight area can be easily and properly increased. As a result, the difference in weight between the heavy-weight area and the peripheral area can be increased.

According to another preferred embodiment of the present invention, the heavy-weight area comprises the application-type of damping material which is provided at the substantially central portion of the panel area, and the asphalt-based damping material is provided at the peripheral area having a lower hardness and a greater specific gravity than that of the application-type of damping material provided at the heavy-weight area, whereby the heavy-weight area is configured so as to be heavier than the peripheral area. According to this structure, the vibration energy at the panel area can be further reduced by the vibration damping function of the application-type of damping material and the asphalt-based damping material themselves. Also, since the heavy-weight area comprises the application-type of damping material having higher rigidity and the asphalt-based damping material having lower rigidity is provided at the peripheral area, the difference between the rigidity of heavy-weight area and the rigidity of both the peripheral area and asphalt-based damping material can be provided easily and properly. Thus, the vibration energy can be further reduced by the vibration reduction effect by the difference in rigidity. Accordingly, where that the weight of the heavy-weight area is configured so as to be heavier than the peripheral area with the asphalt-based damping material, by making the application-type of damping material having relatively smaller specific gravity thicker than the asphalt-based damping material having relatively greater specific gravity, the vibration energy can be reduced by the vibration reduction effect by the difference in weight between the heavy-weight area and the peripheral area with the asphalt-based damping material.

According to another preferred embodiment of the present invention, the heavy-weight area comprises an auxiliary component which is attached thereto, whereby the heavy-weight area is configured so as to be heavier than the peripheral area. Accordingly, the weight of the heavy-weight area can be increased easily and properly by the auxiliary component to provide the difference in weight between the heavy-weight area and the peripheral area.

Other features, aspects, and advantages of the present invention will become apparent from the following description which refers to the accompanying drawings.

BRIEF DESCRIPTION OF THE DRAWINGS

FIG. 1 is a perspective view of an underbody of an automotive vehicle according to the first through fourth embodiments of the present invention.

DETAILED DESCRIPTION OF THE INVENTION

Figure 2A:
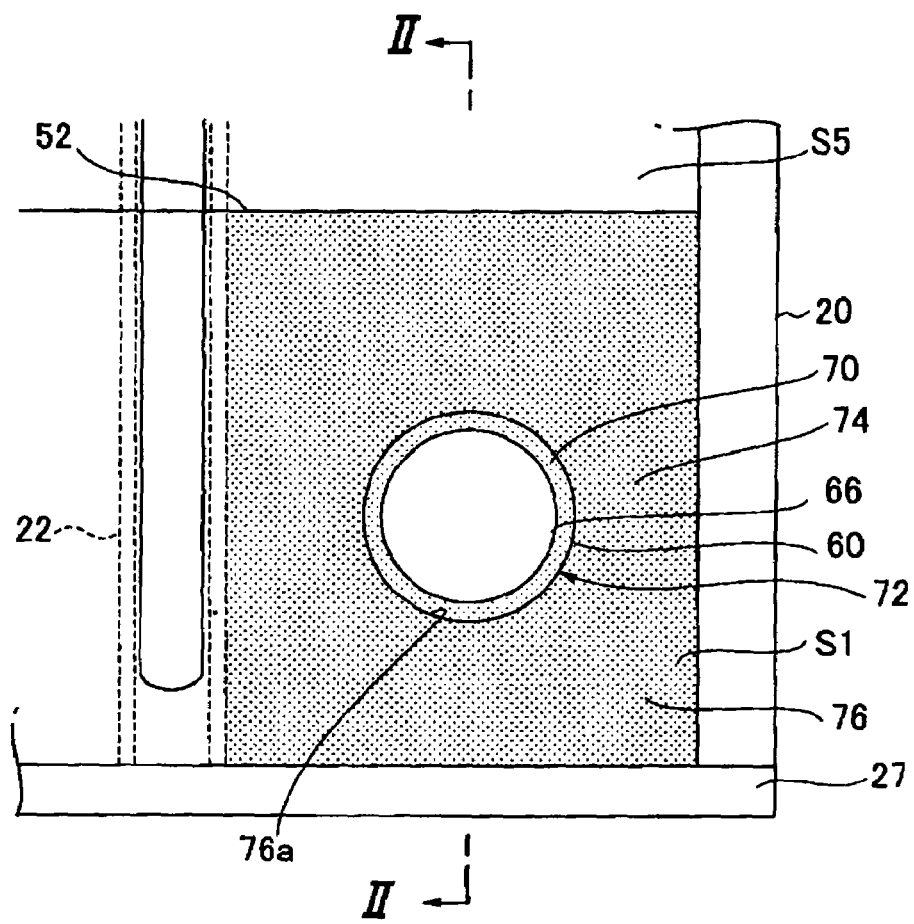
FIG. 2A is an enlarged plan view of a panel area S1 according to the first embodiment of the present invention.

Hereinafter, preferred embodiments of the present invention will be described referring to the accompanying drawings. FIG. 1 is a perspective view of an underbody of an automotive vehicle according to the first through fourth embodiments of the present invention. As illustrated in FIG. 1, an underbody 1 of the automotive vehicle comprises a plurality of frame members, and a plurality of floor panels 2, 4, 6, 8, 10, 12, 14 and 16, which constitute a floor portion of a cabin, which are coupled to these frame members.

First, the frame members will be described referring to FIG. 1. The frame members, as illustrated in FIG. 1, a pair of front side frames 18, side sills 20, floor side frames 22, rear side frames 24, which extend in a longitudinal direction of the vehicle, No. 1 through No. 9 cross members which extend in a vehicle width direction, and No. 1 through No. 3 tunnel side members 36 through 38 which extend in the longitudinal direction between the cross members.

A pair of front side frames 18 having a closed cross section is provided at the front portion of the underbody 1 of the vehicle so as to extend in the longitudinal direction and enclose an engine room from the both sides. A No. 1 cross member 26 having a closed cross section, a reinforced member extending in the vehicle width direction, is connected to front ends of the front side frames 18. Further, to the front side frames are respectively attached an engine 40 and a front suspension cross member 42, and front suspensions 44 are supported at the front suspension cross member 42.

To rear ends of the front side frames 18 is coupled a No. 2 cross member 27 which extends in the vehicle width direction at a front end portion of the floor portion of the vehicle body. The No. 2 cross member 27 is attached to a lower slant portion of a dash panel (not illustrated) which separates the cabin from the engine room, and comprises a pair of torque box members 27a having a closed cross section which is disposed outside the front side frames 18, and a dash lower cross member 27b having a closed cross section which is disposed between the front side frames 18. The above-described side sills 20, floor side frames 22 and rear side frames 24, which respectively extend in the longitudinal direction as reinforcing members, axe provided at a floor portion in back of the No. 2 cross member 27.

The side sills 20 have a closed cross section, and front ends of the side sills 20 are coupled to the both ends of the No. 2 cross member 27. Inner edge portions of the side sills 20 are curved inward at a region from their substantially medium portions located between the No. 3 cross members 28 and the No. 4 cross members 29 to their portions located at the No. 4 cross members 29. Also, to the side sills are connected lower end portions of pillars 35 which extend upward, and upper end portions of the pillars 35 are connected to a vehicle roof.

Between these side sills 20 are respectively provided the floor side frames 22 having a U-shaped cross section, and the front ends of the floor side frames 22 are coupled to rear end portions of the front side frames 18 and the No. 2 cross member 27. The floor side frames 22 are curved inward at portions 22a between the No. 3 cross member 28 and the No. 4 cross member 29. Further, the floor side frames 22 are bent in the vehicle width direction at connecting portions 29a with the No. 4 cross member 29 and connecting portion 30a with the No. 5 cross member 30, respectively. Other portions of the floor side frames 22 extend substantially straight.

Front end portions of the rear side frames 24 having a U-shaped cross section are coupled to respective rear end portions of the floor side frames 22. Also, respective front end portions of the rear side frames 24 are bent outward and also connected to inside faces of the side sills 20. At these front end portions are provided reinforcing members 24a extending in the vehicle width direction. These rear side frames 24 extend to rear end edge portions of the floor portion, and a rear suspension cross member 46 is attached thereto between a No. 7 cross member 32 and a No. 8 cross member 33. Rear suspensions 48 are supported at the rear suspension cross member 46.

In addition to the above-described No. 1 cross member 26 and No. 2 cross member 27, there are provided the No. 3 through No. 8 cross members 28 through 33 having the U-shaped cross section, and a No. 9 cross member 34 having a closed cross section, as reinforcing members extending in the vehicle width direction. The No. 3 cross member 28 is provided in back of the No. 2 cross member 27 and extends substantially straight in the vehicle width direction, in parallel to the No. 2 cross member 27. The No. 3 cross member 28 is coupled to the side sills 20 at both end portions, and passes across the floor side frames 22 at the both sides and are connected thereat.

In back of the No. 3 cross member 28 is provided the No. 4 cross member which extends in the vehicle direction straight in parallel to the No. 3 cross member 28. The lateral both end portions of the No. 4 cross member 29 are connected to the side sills 20 near the pillars 35, respectively, and there is provided a low-rigidity area 110, which will be described below, near this portion. Also, the No. 4 cross member 29 crosses the floor side frames 22 at its lateral both ends and are connected to the floor side frames 22. These No. 3 and No. 4 cross members 28 and 29 project upward at the central portion where a floor tunnel portion 50.

The No. 5 cross member 30, No. 6 cross member 31 and No. 7 cross member 32 are provided in back of the No. 4 cross member 29, and these cross members 30, 31 and 32 extend substantially straight in the vehicle width direction, in parallel to each other. Both end portions of the No. 5 cross member 30 are coupled to the floor side frames 22, and respective both ends of the No. 6 and No. 7 cross members 31 and 32 are coupled to the rear side frames 24. In back of the No. 7 cross member 32 is provided the No. 8 cross member 33 which is curved forward at its central portion so as to extend in the vehicle width direction. And, both end portions of the No. 8 cross member 33 are coupled to the rear side frames 24, respectively. Further, behind the No. 8 cross member 33 is provided the No. 9 cross member 34 having the closed cross section which extend substantially straight in the vehicle width direction at the rear end edge portion of the floor portion. Both end portions of the No. 9 cross member 34 are coupled to rear end portions of the rear side frames 24, respectively.

In addition to the above-described front side frames 18, side sills 20, floor side frames 22 and rear side frames 24, there are provided No. 1 through No. 3 tunnel side members 36 through 38 having the U-shaped cross section which respectively extend in the longitudinal direction at both-side edge portions of the floor tunnel portion 50, as reinforcing members extending in the vehicle width direction. The No. 1 tunnel side members 36 extend substantially straight between the No. 2 cross member 27 and the No. 3 cross member 28, and its both end portions are coupled to the cross members 27 and 28, respectively.

The No. 2 tunnel side members 37 extends substantially straight between the No. 4 cross member 29 and the No. 5 cross member 30, and its both end portions are coupled to the cross members 29 and 30, respectively. The No. 3 tunnel side member 38 extend substantially straight between the No. 6 cross member 31 and the No. 7 cross member 32, and its both end portions are coupled to the cross members 31 and 32, respectively.

The above-described frame members having the U-shaped cross section, i.e., the floor side frames 22, rear side frames 24, No. 3 through No. 8 cross members 28 through 33 and No. 1 through No. 3 tunnel side members 36 through 38, are provided in such a manner that their open ends of the U-shaped cross section are directed upward and their flange portions are fixed to respective lower faces of the floor panels 2, 4, 6, 8, 10, 12, 14 and 16 to form substantially rectangular closed cross sections thereby.

Next, the floor panel will be described referring to FIG. 1. As illustrated in FIG. 1, the first through eighth floor panels 2, 4, 6, 8, 10, 12, 14 and 16 which are made of steel plates with press forming are provided at the underbody 1 of the automotive vehicle. The first floor panel 2 is provided so as to cover an area enclosed by the No. 2 cross member 27, side sills 20 and No. 3 cross member 28, and its central portion projects upward to form the floor panel portion 50 extending in the longitudinal direction. The first floor panel 2 is coupled to a rear side face of the No. cross member 27 at a front edge portion of its one side, and lower faces of other edge portions at its remaining three sides are coupled to the side sills 20 and No. 3 cross member 28, respectively. Further, lower faces of both sides of the first floor panel 2 are coupled to the No. 1 tunnel member 36 and the floor side frame 22, respectively.

Further, there are provided bent line portions 52 on the first floor panel 2 at both sides of the floor tunnel portion 50, which extend substantially straight in the vehicle width direction in parallel to the No. 2 cross member 27 and No. 3 cross member 28. The bent line portions 52 are formed by bending the first floor panel 2 in the longitudinal direction at a specified angle with a straight bending line. At the first floor panel 2 are formed eight panel area S1 through S8 which are enclosed by the frame members 20, 22, 27, 28 and 36 and the bent line portions 52. The panel area S5 through S8 extend backward and upward, i.e., obliquely, from the panel area S1 through S4.

The second floor panel 4 is provided so as to cover an area enclosed by the No. 3 cross member 28, side sills 20 and No. 4 cross member 29, and its central portion projects upward to form the floor panel portion 50 extending in the longitudinal direction. The second floor panel 4 is coupled to the No. 3 cross member 28, side sills 20 and No. 4 cross member 29 at lower faces of edge portions at its four sides, respectively. Further, lower faces of both sides of the second floor panel 4 are coupled to the floor side frame 22, respectively.

Also, there are provided bent line portions 54 having a straight bending line at both edge portions of the floor tunnel portion 50 on the second floor panel 4. The floor tunnel portion 50 rises from the bent line portions. Further, on the second floor panel 4 are provided beads 56 which extend substantially straight along and at both sides of the above-described curved portions 22a of the floor side frames 22. The beads 56 extend from the No. 3 cross member 28 to the No. 4 cross member 29. At the second floor panel 4 are formed four panel area S9 through S12 which are enclosed by the frame members 20, 22, 28 and 29, the bent line portions 54 and the beads 56.

The third floor panel 6 is provided so as to cover an area enclosed by the No. 4 cross member 29, floor side frames 22 and No. 5 cross member 30, and its central portion projects upward to form the floor panel portion 50 extending in the longitudinal direction. The third floor panel 6 is coupled to the No. 4 cross member 29, floor side frames 22 and No. 5 cross member 30 at lower faces of edge portions at its four sides, respectively. Further, lower faces of both sides of the third floor panel 6 are coupled to the No. 2 tunnel side member 37, respectively.

Further, there are provided beads 58 on the third floor panel 6 at both sides of the floor tunnel portion 50, which extend substantially straight in the vehicle width direction in parallel to the No. 4 cross member 29 and No. 5 cross member 30. The beads 58 are formed by projecting part of the third floor panel 6 upward. At the third floor panel 6 are formed four panel area S13 through S16 which are enclosed by the frame members 22, 29, 30 and 37, and the beads 58.

The fourth floor panel 8 is provided outside the third floor panel 6 and extend in the longitudinal direction so as to cover an area enclosed by the No. 4 cross member 29, side sills 20, floor side frames 22 and rear side frames 24, and its rear edge portion extends near the No. 8 cross member 33. The fourth floor panel 8 is coupled to the respective frame members 20, 22, 24 and 29. The fifth floor panel 10 is provided so as to cover an area enclosed by the No. 5 cross member 30, No. 6 cross member 31, floor side frames 22 and rear side frames 24. The fifth floor panel 10 is coupled to the frame members 22, 24, 30 and 31 at lower faces of edge portions at its four sides, respectively.

The sixth floor panel 12 is provided so as to cover an area enclosed by the No. 6 cross member 31, No. 7 cross member 32 and rear side frames 24. The sixth floor panel 12 is coupled to the frame members 24, 31 and 32 at lower faces of edge portions at its four sides, respectively. The seventh floor panel 14 is provided so as to cover an area enclosed by the No. 7 cross member 32, No. 8 cross member 33 and rear side frames 24. The seventh floor panel 12 is coupled to the frame members 24, 32 and 33 at lower faces of edge portions at its four sides, respectively. The eighth floor panel 16 is provided so as to cover an area enclosed by the No. 8 cross member 33, No. 9 cross member 34 and rear side frames 24. The eighth floor panel 16 is coupled to the frame members 24, 33 and 34 at lower faces of edge portions at its four sides, respectively.

At the underbody 1 of the automotive vehicle described above, vibration of the engine 40, front suspension 44 and rear suspension 48 is transmitted to the floor side frames 22 and rear side frames 24 via the front suspension cross member 42, front side frames 18 and rear suspension cross member 46, and then to the cross members 26 through 34, side sills 20 and tunnel side members 36 through 38. The transmitted vibration is further transmitted to the first through eighth floor panels 2, 4, 6, 8, 10, 12, 14 and 16, thereby generating acoustic emission.

The first through third embodiments of the present invention are to suppress the noise generated from the panel area S1 through S4, S9, S12, S13 through S16 of the first through third floor panels 2, 4 and 6, which is caused by the vibration transmitted from the frame members, by providing a vibration reduction structure respectively at those panel area.

Herein, the vibration reduction structure of the vehicle body according to the present embodiments comprises a high-rigidity and/or heavy-weight area (high-rigidity area, heavy-weight area) and a low-rigidity and/or light-weight area (low-rigidity area, light-weight area, peripheral area) which are provided at specified area of the floor panels which are enclosed by the frame members and the like. The vibration energy transmitted to this area is increased at the low-rigidity area (the peripheral area) and/or the light-weight area (the peripheral area) due to the difference in rigidity between the high-rigidity area and the low-rigidity area, and/or the difference in weight between the heavy-weight area and the light-heavy area. This increased vibration energy causes a large vibration strain, and this large vibration strain produces a high vibration damping effect by a vibration damping function of a material (for example, steel plate) which forms the floor panel. Accordingly, the vibration can be reduced effectively. Thus, the acoustic emission generated from the respective area is reduced effectively by the vibration reduction structure.

Also, according to the fourth embodiment of the present invention, the vibration transmission reduction structure is provided at the No. 4 cross member 29 which is connected to the side sill 20. Accordingly, the vibration transmitted to the panel area S10, S11, S13 and S14 from the side sill 20 via the No. 4 cross member 29 is reduced. There are also provided the above-described vibration reduction structure at the panel area S10 and S11.

Herein, the vibration transmission reduction structure will be described. The vibration transmission reduction structure is that a specified low-rigidity area having a low rigidity is provided near a connecting portion of the cross member with the side frames, such as the side sill 20, floor side frame 22 and rear side frame. The side frame generally generates a torsional vibration with deformation to be slant laterally and or a bending vibration with a deformation to be bent longitudinally, and thereby the low-rigidity area at the cross member tends to be deformed easily. Thus, the vibration transmitted from the side frame tends to be increased at the low-rigidity area intensively. Accordingly, the vibration will be suppressed from being transmitted toward the inside of the vehicle from the low-rigidity area, and the vibration transmitted to the respective panel area from the cross member is reduced properly. As a result, the acoustic emission generated from the respective floor area is reduced. Herein, the panel area S5 through S8 and the fourth through eighth floor panels 8, 10, 12, 14 and 16 are formed by the conventional panel.

Figure 2B:
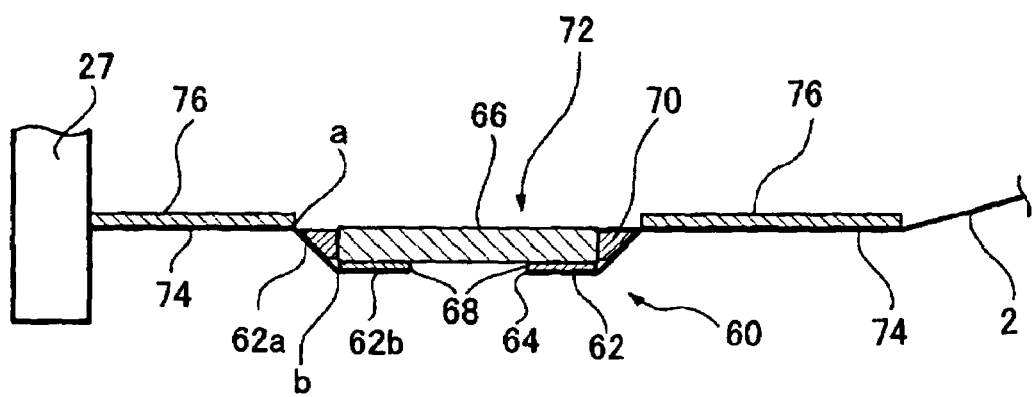
FIG. 2B is a sectional view taken along line II-II of FIG. 2A, illustrating a sectional structure of the panel area S1 in the longitudinal direction of the vehicle.

At first, the first embodiment of the present invention will be described specifically referring to FIGS. 1 and 2A, 2B. In the present embodiment, within the panel area S1, S4, S9 and S12 are provided an opening portion 60 for draining excessive paints of cation painting in the manufacturing the floor panel and a plug 66 for being applied to the opening, which constitute the high-rigidity area (heavy-weight area) 72. A peripheral area 74 is constituted as a low-rigidity area (light-weight area) 74. Accordingly, there is provided the structure to obtain the vibration reduction effect surely due to the difference in rigidity and weight between them. The basic shape and disposition of the vibration reduction structure respectively provided within the panel area S1, S4, S9 and S12 are almost the same, therefore the panel area S1 will be described primarily. FIG. 2A is an enlarged plan view of the panel area S1 according to the first embodiment of the present invention, and FIG. 2B is a sectional view taken along line II-II of FIG. 2A, illustrating a sectional structure of the panel area S1 in the longitudinal direction of the vehicle.

First, the constitution and shape of the panel area S1, S4, S9 and S12 will be described specifically referring to FIGS. 1 and 2A, 2B. As illustrated in FIGS. 1 and 2A, the panel area S1 and S4 are formed respectively by being enclosed by the frame members 20, 22 and 27 and the bent line portion 52. Herein, the No. 2 cross member 27 and the bent line portion 52, and the side sill 20 and the floor side frame 22 constitute two pairs of substantially parallel and straight lines, thereby providing the substantially rectangular panel area. Herein, the bent line portion 52 is formed by bending the first floor panel 2 with the straight bending line, as described above, and constitutes a vibration restraint portion to control the vibration area of the panel area S1 or S4, by restraining a vibration linkage between vibration occurring at the panel area S1 or S4 and vibration occurring at the panel area S5 or S8 next to the panel area S1 or S4.

Also, as illustrated in FIG. 1, the panel area S9 and S12 are formed respectively in the substantially rectangular shape by being enclosed by the frame members 20, 28 and 29 and the bead 56 being provided along a curved portion 22a of the floor side frame 22. The No. 3 cross member 28 and the bead 56 extend substantially straight, respectively. The two sides formed by the No. 4 cross member 29 and the side sill 20 are formed so as to include a curved portion 22a of the side sill 20 between them. The bead 56 functions as a vibration restraint portion to control the vibration area of the panel area S9 and S12.

Next, the vibration reduction structure provided at the panel area S1 will be described specifically referring to FIGS. 2A, 2B. The vibration reduction structure provided at the panel area S4, S9 and S12 is substantially the same as the one of FIGS. 2A, 2B. As illustrated in FIG. 2A, the circular opening portion 60 is formed at the central portion of the panel area S1 so as not to contact the frame members 20, 22, 27 and the bent line portion 52. As illustrated in FIG. 2B, this opening portion 60 comprises a difference-in-level portion 62 which projects downward at its periphery and a through hole 64 which is formed at this difference-in-level portion. These portion 62 and through hole 64 are formed by a press forming. The difference-in-level portion 62 includes an outer peripheral portion 62a which extends slant and an inner peripheral portion 62b which extends horizontally, and it is bent at portions a and b in FIGS. 2A, 2B, to increase its rigidity properly. And, the plug 66 is provided at the inner peripheral portion 62b so as to close the through hole 64.

The plug 66 is made of a circular steel plate which is large enough to close the through hole 64 at the opening portion 60 through the press forming, as illustrated in FIG. 2A. And, as illustrated in FIG. 2B, the plate of the plug 66 is thicker than the floor panel 2, and its rigidity and weight per unit area are larger than those of the floor panel 2.

The excessive paints of cation painting in painting the floor panel is drained out of the through hole 64. Since the through hole 64 is formed at the difference-in-level portion 62 projecting downward, the excessive paints can be drained easily and properly. After paining, the plug 66 is fixed firmly to the floor panel so as to close the through hole firmly by an adhesive 68. Also, there is provided a seal member 70 between the periphery of the plug 66 and the outer peripheral portion 62a of the difference-in-level portion 62. Herein, the adhesive 68 may also function as the seal member 70, and the plug 66 may be fixed by welding.

In the present embodiment, the above-described opening portion 60 and the plug 66 constitute the high-rigidity area (heavy-weight area) 72, and the peripheral area of the opening area 60 and plug 66 constitute the low-rigidity area (light-weight area) 74. The border between the high-rigidity area 72 and the light-rigidity area 74 is the portion a of the difference-in-level portion 62. Herein, the difference-in-level portion 62 may not be formed necessarily. Namely, the through whole 64 may be formed at a flat portion of the floor panel 2, and the plug 66 may be fixed so as to close this through hole 64. In this case, the peripheral portion of the plug 66 would be the border between the high-rigidity area 72 and the low-rigidity area 74. Also, this through hole 64 may function as a hole for positioning the floor panel in the press forming.

As illustrated in FIG. 2B, the low-rigidity area 74 is formed horizontally and a damping material 76 is pasted on the entire area of the area 74. This damping material 76, as illustrated in FIG. 2A, is formed in a sheet shape, and has a substantially rectangular outer shape and a circular opening 76a at its center, along an outer peripheral edge a of the high-rigidity area 72. Herein, the width of the low-rigidity area 74, i.e., the distance between the border a of the high-rigidity area 72 and the respective frame members 20, 22, 27 or the bent line portion 52 is properly provided so as not to increase the rigidity of the low-rigidity area 74 inappropriately.

Herein, an asphalt-based damping material with an approximately 1.7 specific gravity; an approximately 6B pencil-hardness (product name: Damping sheet by Hirotani Corporation) may be applied as the above-described damping material 76. The thickness of the damping material 76 is configured such that the total rigidity of the damping material 76 and the low-rigidity area 74 is lower than the rigidity of the high-rigidity area 72, i.e., the total rigidity of the opening portion 60 and the plug 66.

Figure 3A:
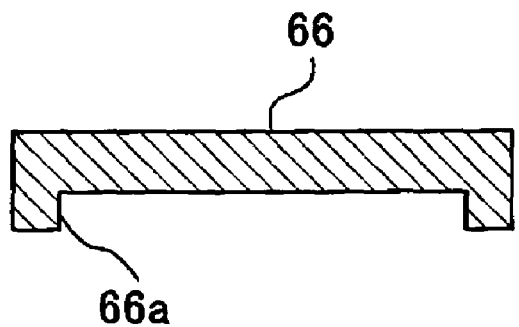
FIG. 3A is a sectional view of a first modified example of a plug according to the first embodiment of the present invention.
Figure 3B:
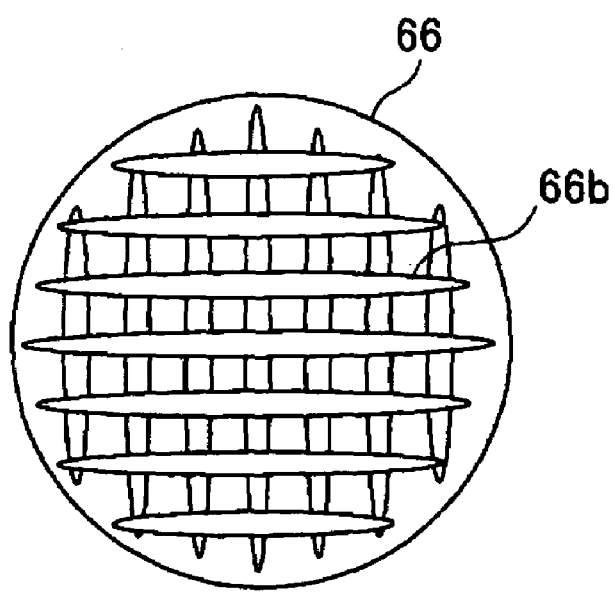
FIG. 3B is a plan view of a second modified example of the plug according to the first embodiment of the present invention.

Next, a modified example of the plug 66 will be described referring to FIGS. 3A and 3B. FIG. 3A is a sectional view of a first modified example of the plug, and FIG. 3B is a plan view of a second modified example of the plug. As illustrated in FIG. 3A, the plug 66 according to the first modified example includes a peripheral edge projection 66a which projects at its peripheral downward, which is formed unitarily by the press forming. This projection 66a further increases the rigidity, particularly the bending and torsional rigidity of the plug 66. The projection 66a may be formed so as to project upward, and if an enough rigidity is ensured, the projection 66a may be formed just at a partial portion of its periphery or its center. Next, as illustrated in FIG. 3B, the plug 66 according to the second modified example includes plural beads 66b which are provided at an upper face thereof, which is formed unitarily by the press forming. These beads 66b further increase the rigidity of the plug 66.

Next, the function and effect of the floor panel structure according to the first embodiment will be described. Since the high-rigidity area 72 comprising the plug 66 and the opening portion 60 and the low-rigidity area 74 being provided around the high-rigidity area 72 are formed within the panel area S1, S4, S9 and S12 of the floor panel structure, the vibration energy is increased at the low-rigidity area 74 due to the difference in rigidity between the high-rigidity area 72 and the low-rigidity area 74. Further, since the high-rigidity area 72 also constitutes the heavy-weight area 72 which is made heavier per unit area than the low-rigidity area 74 by the plug 66 and the low-rigidity area 74 also constitutes the light-weight area (the peripheral area) 74, the vibration energy is further increased at the light-weight area (the peripheral area) 74 due to this difference in weight between the heavy-weight area 72 and the light-weight area 74.

The vibration energy being properly increased at the low-rigidity area (light-weight area) 74 is transformed to the thermal energy by the damping effect of the steel plate forming the floor panel 2 and 4. Thus, the vibration energy at the panel area S1, S4, S9 and S12 is reduced, and thereby the acoustic emission generated from the panel area is reduced. Further, since the damping material 76 is provided at the low-rigidity area (light-weight area) 74, the vibration energy being increased at the low-rigidity area (light-weight area) 74 is further reduced.

Next, the function and effect of the opening area 60 and the plug 66, which constitute the high-rigidity area (heavy-weight area) 72, will be described. Since the high-rigidity area (heavy-weight area) 72 comprises the opening area 60 for draining the excessive cation paints and the plug 66 applied to the opening area 60, that draining can be attained easily and the high-rigidity area (heavy-weight area) 74 having properly increased rigidity and weight by the plug 66, which is applied to the opening area 60 after that, can be obtained properly.

Also, since the plug 66 is formed separately from the floor panels 2 and 4, its rigidity can be increased appropriately. In the present embodiment, the plug 66 is configured so as to be thicker than the floor panels 2 and 4. Accordingly, the high-rigidity area 72 can be increased greatly by being located properly without having any interference with objects, such as the exhaust pipe and auxiliary components, and with its appropriate height which can provide the passengers with comfortable stepping. Also, since the weight of the area 72 can be increased easily and properly by the plug 66 formed separately, the difference in weight between the heavy-weight area 72 and the light-weight area 74 can be increased properly.

Also, since the difference-in-level portion 62 having bent portions a and b illustrated in FIG. 2B is provided at the opening area 60, the rigidity of the high-rigidity area 72 can be further increased. Also, since this difference-in-level portion 62 projects downward, the excessive paints can be drained smoothly and easily out of the through hole 64 formed thereat. Herein, the high-rigidity area (heavy-weight area) 72 and the low-rigidity area (light-weight area) 74 are configured so as to provide the both differences in rigidity and weight in the present embodiment. However, only the difference in rigidity or the difference in weight can be obtained by adopting proper shape and size of the opening area 60, and proper shape, size, and material of the plug 66. In this case, the vibration energy can be also increased at the low-rigidity area or the light-rigidity area.

Since the plug 66 according to the first modified example includes the peripheral edge projection 66a projecting at its peripheral downward, this projection 66a further increases the rigidity, particularly the bending and torsional rigidity of the plug 66. As a result, the difference in rigidity between the high-rigidity area 72 and the low-rigidity area 74 can be further increased. Likewise, since the plug 66 according to the second modified example includes the plural beads 66b provided at the upper face thereof, these beads 66b further increase the rigidity of the plug 66. Thus, the difference in rigidity between the high-rigidity area 72 and the low-rigidity area 74 can be further increased. Also, these projection 66a and beads 66b can be made easily by the press forming. Herein, these projection 66a and beads 66b may be integrated with the plug 66 via adhesive or the like.

According to the present embodiment and its modified examples which are described above, the vibration energy at the panel area can be reduced effectively by increasing properly the differences in rigidity and/or weight even though there exists the above-described limitations in vehicle-body structure or manufacturing, such as the heights, dispositions, sizes or the like.

Figure 4A:
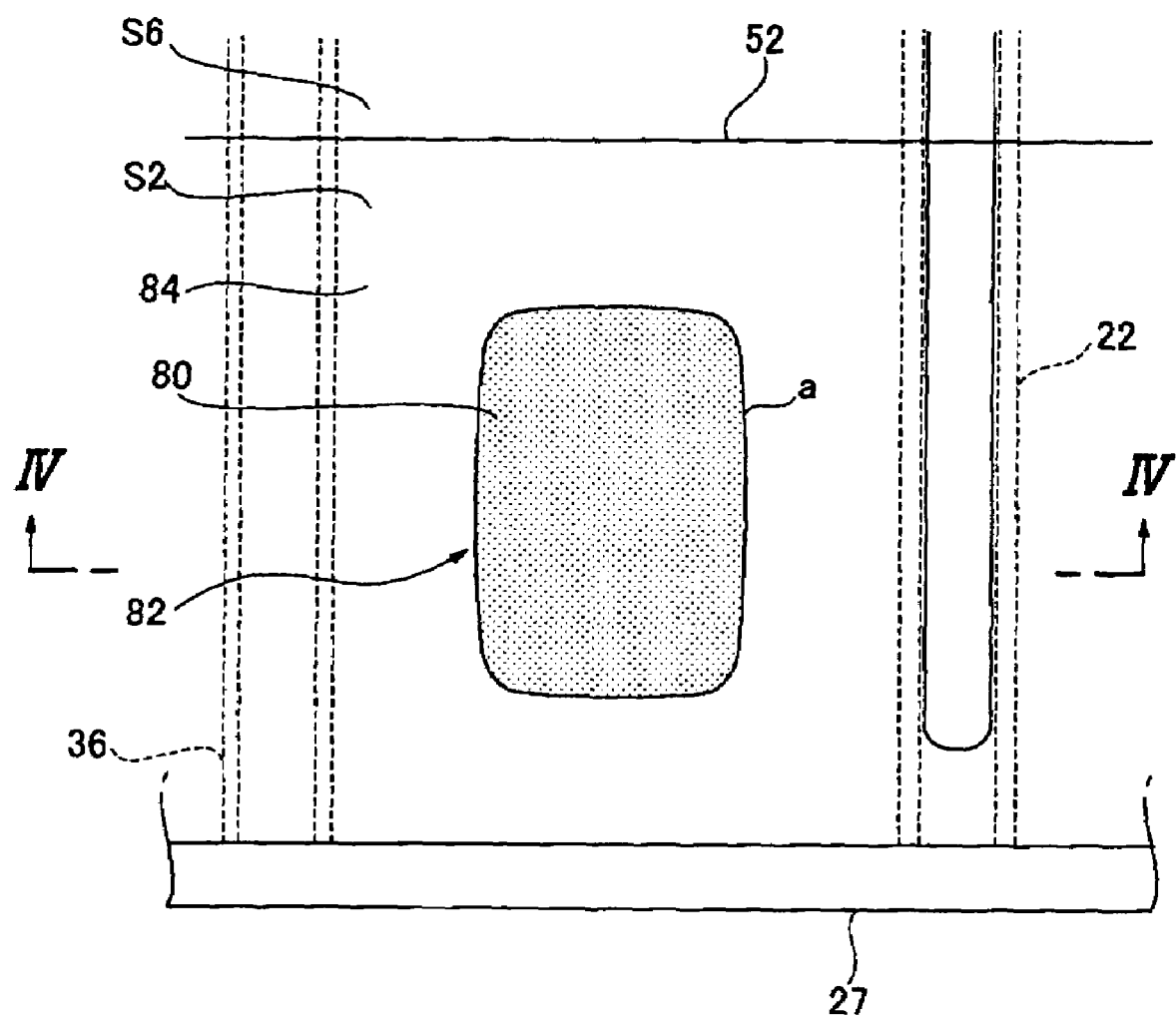
FIG. 4A is an enlarged plan view of a panel area S2 according to the second embodiment of the present invention.

Next, the second embodiment of the present invention will be described specifically referring to FIGS. 1 and 4A, 4B. In the present embodiment, within the panel area S2 and S3 is provided a damping material 80 with a specified location and size, and a panel portion with this damping material 80 is configured so as to be a high-rigidity area (heavy-weight area) 82, while a peripheral area around the area 82 is configured so as to be a low-rigidity area (light-weight area) 84, thereby providing the vibration reduction effect by the differences in rigidity and weight. The basic shape and disposition of the vibration reduction structure respectively provided within the panel area S2 and S3 are almost the same, therefore the panel area S2 will be described primarily. FIG. 4A is an enlarged plan view of the panel area S2 according to the second embodiment of the present invention, and FIG. 4B is a sectional view taken along line IV-IV of FIG. 4A, illustrating a sectional structure of the panel area S2 in the width direction of the vehicle.

First, the constitution and shape of the panel area S2 and S3 will be described specifically referring to FIGS. 1 and 4A, 4B. As illustrated in FIGS. 1 and 4A, the panel area S2 and S3 are formed respectively by being enclosed by the frame members 22, 27 and 36 and the bent line portion 52 as the vibration restraint portion. Herein, the No. 2 cross member 27 and the bent line portion 52, and the floor side frame 22 and the No. 1 tunnel side member 36 constitute two pairs of substantially parallel and straight lines, thereby forming the substantially rectangular panel area.

Next, the vibration reduction structure provided within the panel area S2 will be described specifically referring to FIGS. 4A and 4B. The vibration reduction structure provided within the panel area S3 is the same as the one illustrated in FIGS. 4A, 4B. As illustrated in FIG. 4A, the substantially rectangular damping material 80 is placed at the central portion of the panel area S2 so as not to contact the respective frame members 22, 27, 36 and the bent line portion 52. This damping material 80 is formed in the substantially rectangular outer shape with slightly curved four sides. This damping material 80 is, for example, an application-type of damping material with an approximately 1.1 specific gravity; an approximately 2H pencil-hardness (water acryloyl emulsion) (product name: NT Damping Coat W-250 by Nippon Tokushu Toryo Corporation).

Figure 4B:
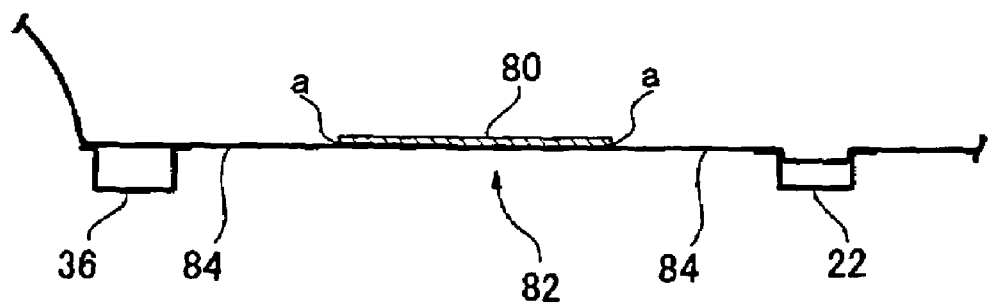
FIG. 4B is a sectional view taken along line IV-IV of FIG. 4A, illustrating a sectional structure of the panel area S2 in the vehicle width direction of the vehicle.

As illustrated in FIG. 4B, the panel area S2 is formed in a substantially flat shape, and the damping material 80 and the central panel portion with this damping area 80 constitute the high-rigidity area 82 with its increased rigidity, while the flat peripheral portion 84 around the high-rigidity area 82 constitutes the low-rigidity area 84. Particularly, the application-type of damping material 80 with the relatively high hardness of 2H pencil-hardness increases the difference in rigidity with the low-rigidity area 84. Further, this damping material 80 and the central panel portion with the damping material 80 constitute the heavy-weight area 82 which is made heavier than the peripheral portion 84 by the weight of the damping material 80 itself, while the peripheral area 84 constitutes the light-weight area 84. Accordingly, the difference in weight between the heavy-weight area 82 and the light-weight area (the peripheral area) 84 is provided. Herein, the width of the low-rigidity area (light-weight area) 84, i.e., the distance between the border a of the high-rigidity area (heavy-weight area) 82 and the respective frame members 22, 27, 36 or the bent line portion 52 is properly provided so as not to increase the rigidity of the low-rigidity area 84 inappropriately.

Next, a first modified example of the present embodiment will be described. The damping material 80 constituting the high-rigidity area (heavy-weight area) 82 may be an asphalt-based damping material. As described above, since the asphalt-based damping material has the approximately 1.7 specific gravity and the approximately 6B pencil-hardness, which is heavier than the application-type of damping material, the great difference in weight between the heavy-weight area 82 and the light-weight area 84 can be obtained particularly.

Figure 5A:
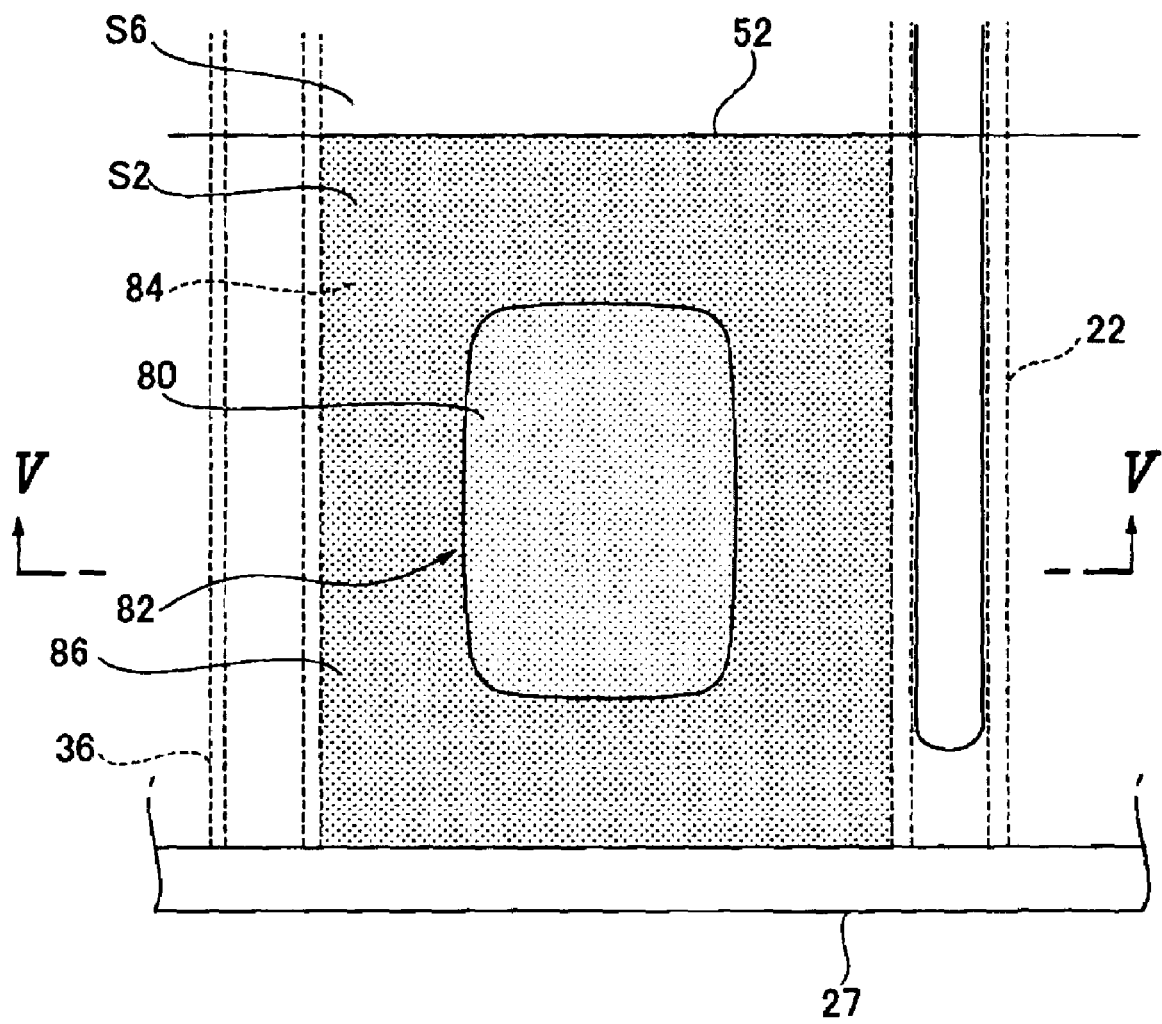
FIG. 5A is a sectional view of a modified example of the second embodiment of the present invention.
Figure 5B:
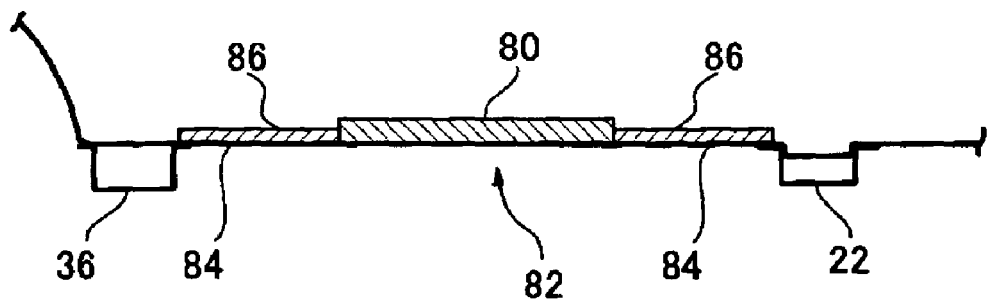
FIG. 5B is a sectional view taken along line V-V of FIG. 5A, illustrating a sectional structure of the modified example in the vehicle width direction of the vehicle.

Next, a second modified example of the present embodiment will be described referring to FIGS. 5A, 5B. As illustrated in these figures, according to this modified example, the application-type of damping material 80 is provided at the central portion of the panel area S2, which constitutes the high-rigidity area (heavy-weight area) 82, and the asphalt-based damping material 86 is provided at the light-weight area (peripheral area) 84. The specific gravity and hardness of the application-type of damping material and the asphalt-based damping material are as described above. In this modified example, the damping material 80 at the high-rigidity area (heavy-weight area) 82 is comprised of the application-type of damping material having the relatively high hardness of 2H pencil-hardness, while the damping material 86 at the low-rigidity area (light-weight area) 84 is comprised of the asphalt-based damping material having the relatively low hardness of 6B pencil-hardness. Thus, the difference in rigidity between the high-rigidity area 82 and the low-rigidity area 84 is obtained.

Meanwhile, the asphalt-based damping material 86 is heavier than the application-type of damping material 80. Accordingly, in the present modified example, as illustrated in FIG. 5B, the application-type of damping material 80 at the high-rigidity area (heavy-weight area) 82 is made thicker, or heavier than the asphalt-based damping material 86 at the low-rigidity area (light-weight area) 84, resulting in the difference in rigidity between them being obtained.

Next, the function and effect of the floor panel structure according to the second embodiment will be described. Since there are provided the high-rigidity area 82 having the damping material 80 and the low-rigidity area 84 being provided around the high-rigidity area 82 within the panel area S2 and S3, the vibration energy is increased at the low-rigidity area 84 due to the difference in rigidity between the high-rigidity area 82 and the low-rigidity area 84. Further, since the high-rigidity area 82 also constitutes the heavy-weight area 82 which is made heavier per unit area than the peripheral area 84 by the damping material 80, the vibration energy is further increased at the light-weight area (the peripheral area) 84 due to this difference in weight between the heavy-weight area 82 and the light-weight area 84.

The vibration energy being properly increased at the low-rigidity area (light-weight area) 84 is transformed to the thermal energy by the damping effect of the steel plate forming the floor panel 2 and 4. Thus, the vibration energy at the panel area S2 and S3 is reduced, and thereby the acoustic emission generated from the panel area is reduced.

Next, the function and effect of the damping material 80 which constitutes the high-rigidity area (heavy-weight area) 82 will be described. Since the high-rigidity area (heavy-weight area) 82 of the present embodiment has the application-type of damping material 80 having the relatively high hardness of 2H pencil-hardness at the panel area S2 and S3, the greater difference in rigidity between the heavy-weight area 82 and the light-weight area 84 can be obtained. Also, since the heavy-weight area 82 which is heavier than the light-weight area 84 is obtained by the weight of the damping material 80 itself, the greater difference in weight between them can be obtained as well. Further, the vibration energy at the panel area S2 and S3 can be also reduced by the vibration damping function of the damping material 80 itself.

Next, since the damping material 80 constituting the high-rigidity area (heavy-weight area) 82 is made of the asphalt-based damping material which is heavier than the application-type of damping material in the first modified example, the difference in weight between the heavy-weight area (heavy-weight area) 82 and the low-rigidity area (light-weight area) 84 can be provided properly, resulting in the vibration energy being increased properly at the low-rigidity area (light-weight area) 84 by the weight difference.

At the panel area S2 in the second modified example, since the high-rigidity area (heavy-weight area) 82 is comprised of the application-type of damping material 80 having the relatively high hardness (2H pencil-hardness) and the asphalt-based damping material 86 having the relatively low hardness (6B pencil-hardness) is provided at the low-rigidity area (light-weight area) 84, the vibration energy can be reduced by the vibration reduction effect due to the difference in rigidity between the high-rigidity area 82 and the low-rigidity area 84. Also, the vibration energy can be further reduced by the damping function of the application-type of damping material 80 and the asphalt-based damping material 86 themselves.

Meanwhile, since the application-type of damping material 80 at the high-rigidity area (heavy-weight area) 82 is made thicker than the asphalt-based damping material 86 at the low-rigidity area (light-weight area) 84, the weight of the high-rigidity area (heavy-weight area) 82 can be made greater than that of the low-rigidity area (light-weight area) 84 having asphalt-based damping material 86 regardless of the specific gravity of the application-type of damping material 80 (approximately 1.1) being smaller than that of the asphalt-based damping material 86 (approximately 1.7). Thus, the vibration energy can be also reduced by the vibration reduction effect due to the difference in weight between the high-rigidity area (heavy-weight area) 82 and the low-rigidity area (light-weight area) 84 with the asphalt-based damping material 86.

According to the present embodiment and its modified examples which are described above, the vibration energy at the panel area S2 and S3 can be reduced greatly, by providing the damping material 80 and/or the damping material 86 and thereby high-rigidity area (heavy-weight area) 82 and the low-rigidity area (light-weight area (peripheral area)) 84, with the vibration reduction effect due to the differences in rigidity and weight and the damping effect of the damping materials 80 and 86 themselves. Thus, the vibration energy at the panel area can be reduced effectively by the heavy-weight area 82 having heavier weight than the light-weight area (peripheral area) 84 even though there exists the above-described limitations in vehicle-body structure or manufacturing, such as the heights, dispositions, sizes or the like.

Figure 6A:
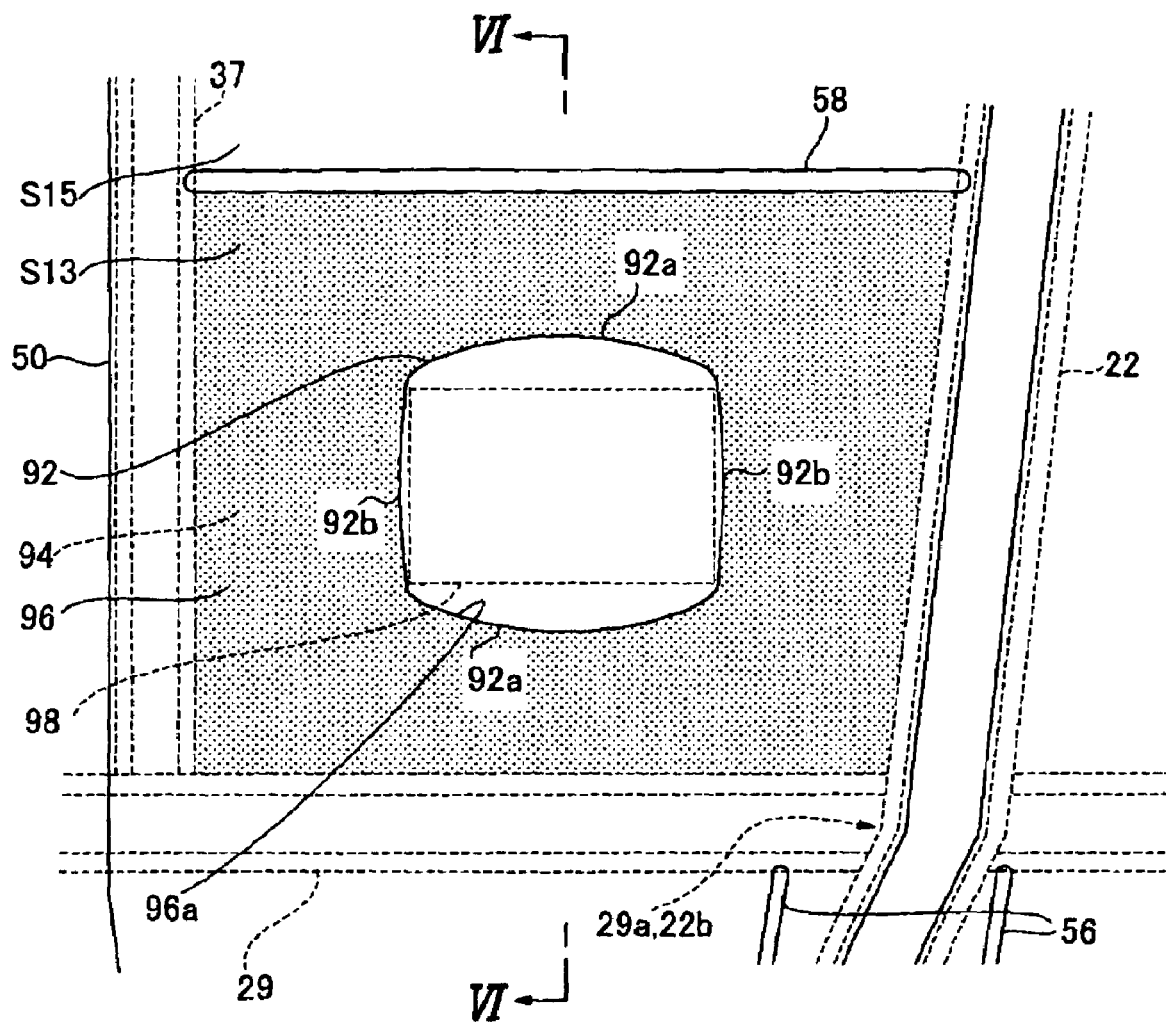
FIG. 6A is an enlarged plan view of a panel area S13 according to the third embodiment of the present invention.
Figure 6B:
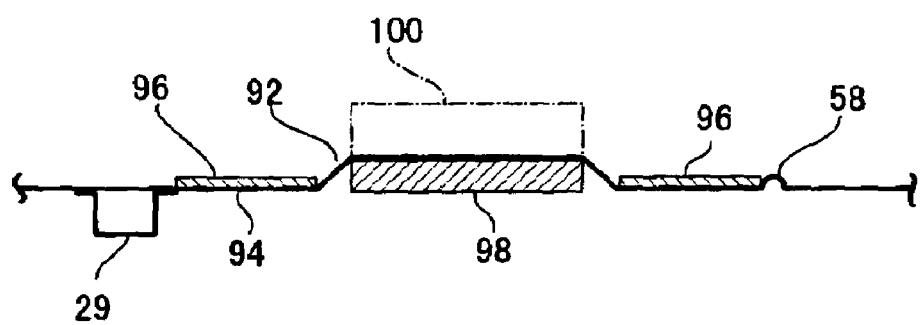
FIG. 6B is a sectional view taken along line VI-VI of FIG. 6A, illustrating a sectional structure of the panel area S13 in the longitudinal direction of the vehicle.

Next, the third embodiment of the present invention will be described specifically referring to FIGS. 1 and 6A, 6B and 7A, 7B. In the present embodiment, within the respective panel area S13 through S16 are provided a high-rigidity area 92 and a low-rigidity area 94, which constitute the vibration reduction structure. Herein, the high-rigidity area 92 is so formed in the substantially rectangular shape with its slightly-curved sides that the vibration reduction effect is obtained surely. The basic shape and disposition of the vibration reduction structure respectively provided within the panel area S13 and S14, or S15 and S16 are almost the same, therefore the panel area S13 and S15 will be described primarily. FIG. 6A is an enlarged plan view of the panel area S13 according to the third embodiment of the present invention, and FIG. 6B is a sectional view taken along line VII-VII of FIG. 6A, illustrating a sectional structure of the panel area S13 in the longitudinal direction of the vehicle.

Figure 7A:
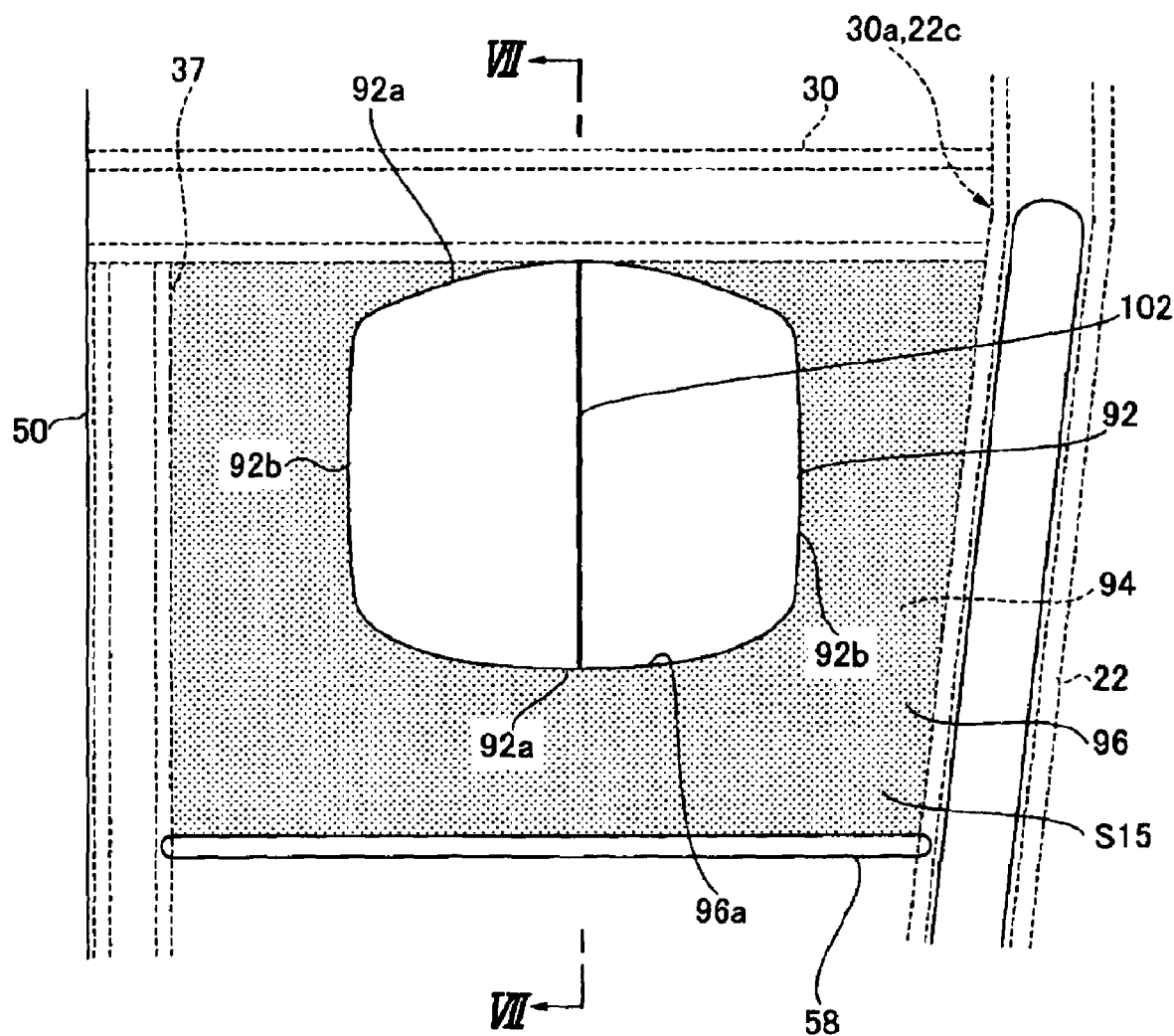
FIG. 7A is an enlarged plan view of a panel area S15 according to the third embodiment of the present invention.

First, the constitution and shape of the panel area S13 through S16 will be described specifically referring to FIGS. 1 and 6A, 6B and 7A, 7B. As illustrated in FIGS. 1 and 6A, the panel area S13 and S14 are formed respectively by being enclosed by the frame members 22, 29 and 37 and the bead 58. Herein, the frame members 22, 29, 37 and bead 58 extend substantially straight, and the No. 4 cross member 29 and the bead 58 constitute a pair of substantially parallel and straight lines, thereby forming the substantially rectangular panel area. Also, as illustrated in FIGS. 1 and 7A, the panel area S15 and S16 are formed respectively by being enclosed by the frame members 22, 37 and 30 and the bead 58. Herein, the frame members 22, 30, 37 and bead 58 extend substantially straight, and the No. 5 cross member 30 and the bead 58 constitute a pair of substantially parallel and straight lines, thereby forming the substantially rectangular panel area.

The floor side frame 22 is bent at the connecting portions 29a and 30a with the No. 4 cross member 29 and the No. 5 cross member 30 (bent portions 22b and 22c), so that the floor side frame 22 extend straight between the No. 4 cross member 29 and the No. 5 cross member 30. Herein, the bead 58 functions as the vibration restraint portion to control the vibration area of the panel area S13 or S14, by restraining a vibration linkage between vibration occurring at the panel area S13 or S14 and vibration occurring at the panel area S15 or S16 next to the panel area S13 or S14.

Next, the vibration reduction structure provided within the panel area S13 will be described specifically referring to FIGS. 6A and 6B. The vibration reduction structure provided within the panel area S14 is the same as the one illustrated in FIGS. 6A, 6B. As illustrated in FIG. 6A, a substantially rectangular high-rigidity area 92 is formed at the central portion of the panel area S13 so as not to contact the respective frame members 22, 29, 37 and the bead 58. Around the high-rigidity area 92 is provided a low-rigidity area 94. As illustrated in FIG. 6B, the high-rigidity area 92 is formed so as to project upward, and thereby its cross section has a shape that its central portion is substantially flat and its periphery extends straight, raising from the low-rigidity area 94.

As illustrated in FIG. 6A, the high-rigidity area 92 includes two long sides 92a extending laterally and two short sides 92b extending longitudinally, and these sides 92a and 92b are slightly curved outward with a specified curvature. Accordingly, the rigidity changes discontinuously at the borders 92a and 92b of the low-rigidity area 94, which will be described in detail below, and thereby the difference in rigidity can be obtained surely. In the present invention, the sides 92a and 92b extend in an arc shape respectively, and the radius of curvature of the long side 92a is smaller than that of the short side 92b. The low-rigidity area 94 extends with a specified width which may not increase the rigidity of the low-rigidity area 94 inappropriately, like the above-described first and second embodiments.

As illustrated in FIGS. 6A and 6B, an asphalt-based damping material 96 is provided at the substantially entire area of the low-rigidity area 94, like the panel area S1. This damping material 96 is formed in a sheet shape and includes an opening 96a with a substantially rectangular shape at its center, the opening edge of which complies with outer peripheral edges 92a and 92b of the high-rigidity area 92.

Next, as illustrated in FIGS. 6A and 6B, a bracket 98 is provided in a space of the high-rigidity area 92 projected upward, and an auxiliary component 100 is attached to an upper face of the high-rigidity area 92 via this bracket 98. The auxiliary component may be such as a CD changer, navigation unit, CPU device, some electric sources, console box, some harnesses and air conditioner devices. In the present embodiment, the high-rigidity area 92 with the auxiliary component 100 constitutes the heavy-weight area 92 which is heavier area than the low-rigidity area 94 due to the weight of the auxiliary component 100 itself, while the low-rigidity area 94 constitutes the light-weight area 94. Also, the weight of the bracket 98 itself also may provide the difference in weight. Further, providing the bracket 98 and the auxiliary component 100 increases the rigidity of the high-rigidity area 92.

Figure 7B:
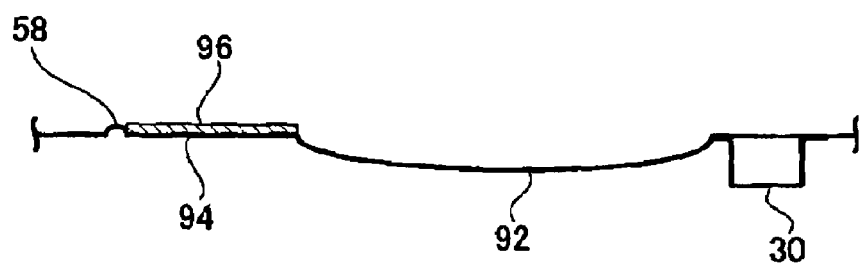
FIG. 7B is a sectional view taken along line VII-VII of FIG. 7A, illustrating a sectional structure of the panel area S15 in the longitudinal direction of the vehicle.

Next, the vibration reduction structure provided within the panel area S15 will be described specifically referring to FIGS. 7A and 7B. The vibration reduction structure provided within the panel area S16 is the same as the one illustrated in FIGS. 7A, 7B. As illustrated in FIG. 7A, the substantially rectangular high-rigidity area 92 and the low-rigidity area 94 located around the high-rigidity area 92 are provided within the panel area S15. As illustrated in FIG. 7B, the high-rigidity area 92 is formed so as to project downward, and thereby its cross section has a dome shape. Herein, the high-rigidity area 92 may be formed so as to project upward. Meanwhile, the low-rigidity area 94 is formed to be substantially flat.

As illustrated in FIG. 7A, the high-rigidity area 92, like the above-described area 92 within the panel area S13, includes sides 92a 92b being slightly curved outward, in which the radius of curvature of the long side 92a is smaller than that of the short side 92b. The high-rigidity area 92 of the panel area S15 contacts the No. 5 cross member 30 at a center of its long side 92a. And, a reinforcing bead 102 is formed at the high-rigidity area 92 so as to extend from the side of No. 5 cross member 30 toward the low-rigidity area 94. Thereby, the rigidity of the high-rigidity area 92 is increased in the longitudinal direction. The low-rigidity area 94 extends with the specified width, like the above-described first and second embodiments.

As illustrated in FIGS. 7A and 7B, an asphalt-based damping material 96 is provided at the substantially entire area of the low-rigidity area 94, like the panel area S1. This damping material 96 is formed in the sheet shape and includes the opening 96a with the substantially rectangular shape at its center, the opening edge of which complies with outer peripheral edges of the high-rigidity area 92.

Next, the function and effect of the floor panel structure according to the third embodiment will be described. Since there are provided the high-rigidity area 92 having the increased rigidity by being formed so as to project upward or downward and the low-rigidity area 94 being provided around the high-rigidity area 92 within the panel area S13 through S16, the vibration energy is increased at the low-rigidity area 94 due to the difference in rigidity between the high-rigidity area 92 and the low-rigidity area 94. Further, since the auxiliary component 100 is attached to the high-rigidity area 92 at the panel area S13 and S14, the rigidity of the high-rigidity area 92 is further increased by the auxiliary component 100 to provide the great difference in rigidity.

Further, the high-rigidity area 92 with the auxiliary component 100 also constitutes the heavy-weight area 92 which is made heavier per unit area than the peripheral area 94 by the auxiliary component 100, the difference in weight between the heavy-weight area 92 and the light-weight area 94 is obtained. Also, the weight of the bracket 98 for attaching the auxiliary component 100 increases the weight difference. As a result, the vibration energy is increased at the low-rigidity area (light-weight area) 94 due to the weight difference.

The vibration energy being properly increased at the low-rigidity area (light-weight area) 94 is transformed to the thermal energy by the damping effect of the steel plate forming the floor panel 2 and 4. Thus, the vibration energy at the panel area S13 through S16 is reduced, and thereby the acoustic emission generated from the panel area is reduced. Further, since the damping material 96 is provided at the low-rigidity area (light-weight area) 94, the vibration energy being increased at the low-rigidity area (light-weight area) 94 is reduced properly.

Next, the function and effect of the shape and disposition of the high-rigidity area (heavy-weight area) 92 will be described. According to the present embodiment, since the sides 92a and 92b of the high-rigidity area 92 are formed by the slightly curved lines with the specified curvature, the rigidity changes discontinuously at the sides 92a and 92b of the border of the low-rigidity area 94 and the difference in rigidity between the high-rigidity area 92 and the low-rigidity area 94 can be increased. As a result, the projecting height of the high-rigidity area 92 can be restrained, and the vibration reduction effect can be obtained without having any interference with objects, such as the exhaust pipe and auxiliary components, and with its appropriate height which can provide the passengers with comfortable stepping. Hereinafter, this function and effect will be described more specifically.

Figure 8A:
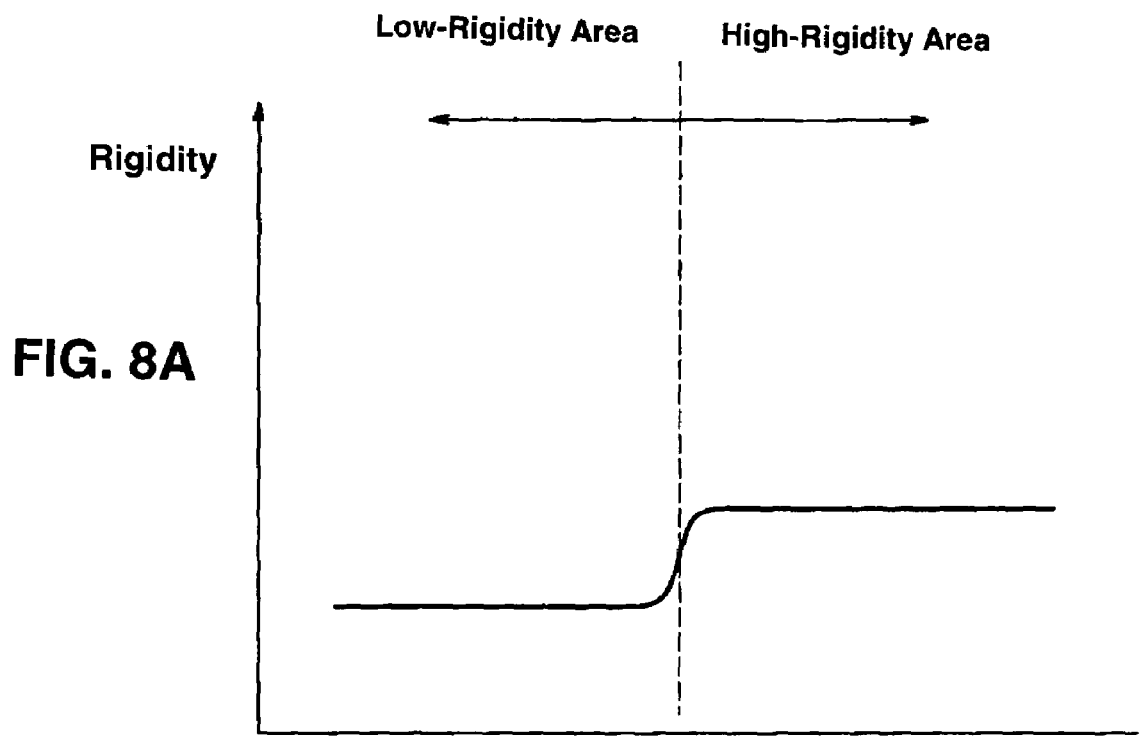
FIG. 8A is a graph showing rigidity distribution of a high-rigidity area and a low-rigidity area of a floor panel according to a comparative sample.

There may be case where it is difficult to form the shape of the high-rigidity area accurately when the high-rigidity area with the restrained projecting height is made by applying the press forming to the floor panel. Namely, the press forming applies a plastic deformation to the steal panel, extending the steel panel. Herein, if the projecting height of the panel is restrained to a specified height and the sides of the projection are formed exactly straight, there may be a case where it is difficult to form such a straight bent line properly at the border between the low-rigidity area and the high-rigidity area (at the sides of the high-rigidity area). In this case, as shown in FIG. 8A, the rigidity at the border between the low-rigidity area and the high-rigidity area changes gradually, and further the rigidity difference between them is not enough large. This may prevent the vibration energy from being increased properly at the low-rigidity area, and thereby a sufficient vibration reduction effect described above may not be obtained.

Figure 8B:
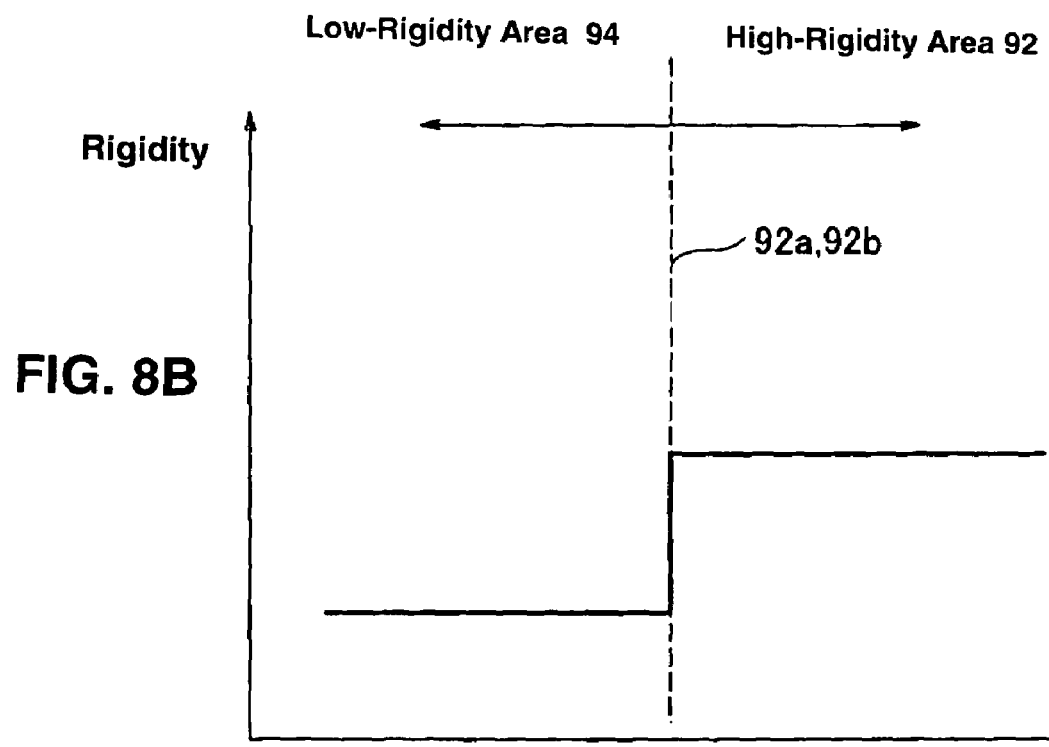
FIG. 8B is a graph showing rigidity distribution of the high-rigidity area and the low-rigidity area of the floor panel according to the third embodiment of the present invention.

Meanwhile, in the case where the sides 92a and 92b of the high-rigidity area 92 are formed by the outward slightly curved lines with the specified curvature like the present embodiment, the press forming should be proper. Namely, the border with curved lines allows the bent lines to be formed properly and clearly. In this case, as shown in FIG. 8B, the discontinuous rigidity change occurs clearly at the border, i.e., the sides 92a and 92b of the high-rigidity area 92, and the magnitude of the rigidity change is greater. Also, the rigidity, particularly the torsional rigidity of the high-rigidity area 92 is further increased. As a result, the vibration energy can be increased at the low-rigidity area intensively and thereby the vibration reduction effect can be obtained surely. Further, since the sides 92a and 92b of the high-rigidity area 92 extend in the arc shape in the present embodiment, the rigidity change at the border can be made discontinuous and greater surely.

Herein, the shorter the side of the border is or the smaller the radius of curvature of the curved side is, the more accurate the press forming is. Since the radius of curvature of the long side 92a is smaller than that of the short side 92b in the present embodiment, the rigidity can change discontinuously at the border surely and the rigidity difference can be made great surely.

Meanwhile, where the curvature radius of the long side 92a extending in the arc shape is small, the long side 92a projects more outwardly toward the low-rigidity area 92, compared with the short side 92b, so that the rigidity of the low-rigidity area 94 might be increased improperly. However, part of the low-rigidity area 94 extending around the long side 92a has its relatively larger area, compared with part of the low-rigidity area 94 extending around the short side 92b. Accordingly, the vibration energy can be increased properly without increasing the rigidity of the above-described part of the low-rigidity area 94 extending around the long side 92a.

Herein, where the high-rigidity area is formed in the circular or oval shape, the rigidity of the high-rigidity area can be changed more discontinuously at the border and its rigidity difference can be increased, but the rigidity of the low-rigidity area may be increased improperly. According to the present embodiment, since the respective sides 92a and 92b of the high-rigidity area 92 are formed by the outward curved lines with the specified curvature and the high-rigidity area 92 is formed in the substantially rectangular shape, the rigidity change at the border can be made discontinuous and the rigidity of the low-rigidity area (light-weight area) 94 extending around the border can be prevented from increasing improperly. Further, since the low-rigidity area 94 is formed with the properly specified width, the vibration energy can be increased intensively and surely at the low-rigidity area (light-weight area) 94.

Since the high-rigidity area 92 at the panel area S15 and S16 contacts the No. 5 cross member 30, the rigidity of the respective high-rigidity area 92 can be increased greatly. Accordingly, where even the panel area has a relatively small entire area and thereby a relatively large rigidity, the rigidity of the high-rigidity area can be increased properly and thus the difference in rigidity between the high-rigidity area 92 and the low-rigidity area 94 can be made great enough, and thereby the vibration energy can be increased surely at the low-rigidity area 94.

Next, the function and effect of the shape of the damping material 96 will be described. Since the damping material 96 includes the opening 96a with the substantially rectangular shape along the outer peripheral edges 92a and 92b of the high-rigidity area 92, by just placing the damping material so that its opening 96a corresponds to the outer peripheral edges 92a and 92b of the high-rigidity area 92, the easy positioning can be obtained and thereby the manufacturing cost can be reduced. Also, since the positing accuracy improves, the damping material 96 can be placed properly without overlapping with the high-rigidity area 92 and the low-rigidity area 94. Thus, the rigidity of the low-rigidity area 94 and the damping material 96 can be prevented from being increased improperly.

According to the present embodiment and its modified examples which are described above, the vibration energy at the panel area can be reduced effectively by increasing properly the differences in rigidity and/or weight between the high-rigidity area 92 and the low-rigidity area 94 even though there exists the above-described limitations in vehicle-body structure or manufacturing, such as the heights, dispositions, sizes or the like.

Figure 9A:
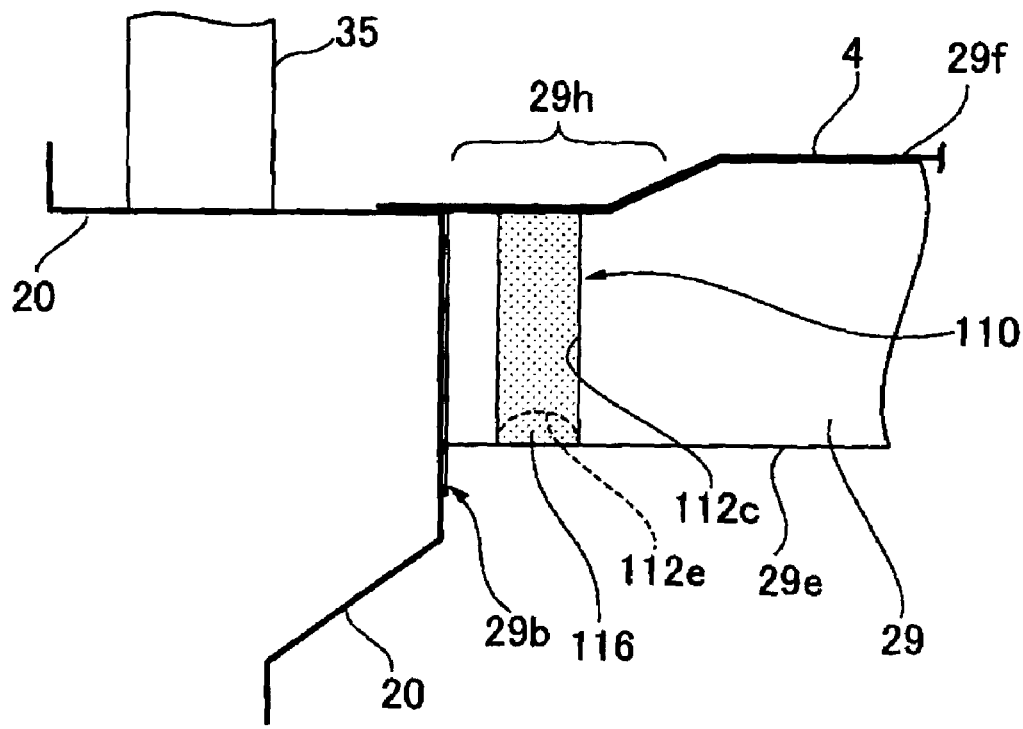
FIG. 9A is a partially enlarged elevation view of a No. 4 cross member along with a side sill and a pillar, viewed from the front of the vehicle, according to the fourth embodiment of the present invention.
Figure 9B:
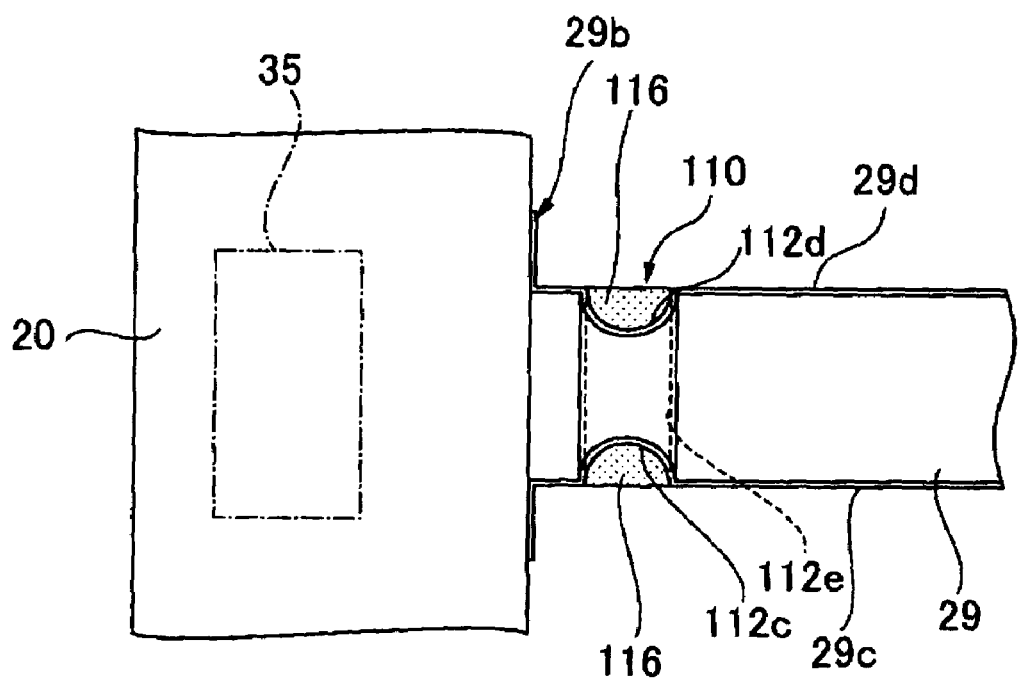
FIG. 9B is a partially enlarged plan view of them, viewed from above, according to the fourth embodiment of the present invention.

Next, the fourth embodiment of the present invention will be described specifically referring to FIGS. 9A, 9B through 12A, 12B. According to the present embodiment, there is provided the vibration transmission reduction structure near the side sill 20 of the No. 4 cross member 29, which reduces the vibration transmitted from the side sill 20 to the floor area S10, S11, S13 and S14 via the No. 4 cross member 29 and the acoustic emission generated from these floor area. Also, within the panel area S10 and S11 is provided a high-rigidity area so as to contact the No. 9 cross member 29 with the reduced vibration transmission. Thus, the vibration is prevented properly from being transmitted from the No. 4 cross member 29 to the panel area S10 and S11, and the vibration reduction effect similar to the panel area S15 and S16 are obtained here by increasing the rigidity of the high-rigidity area properly. FIG. 9A is a partially enlarged elevation view of the No. 4 cross member along with the side sill and the pillar, viewed from the front of the vehicle, according to the fourth embodiment of the present invention, and FIG. 9B is a partially enlarged plan view of them, viewed from above. FIGS. 9A and 9B illustrate the enlarged connecting portion of the No. 4 cross member 29 with the right-side side sill 20.

First, the constitution and shape of the vibration transmission reduction structure which is provided at the No. 4 cross member 29 will be described specifically referring to FIGS. 9A and 9B. As illustrated in the figures, the pillars 35 are connected to the side sills 20, and the No. 4 cross member 29 is connected to the side sills 20 at its both lateral ends near the pillars 35 (see FIG. 1). The No. 4 cross member 29 is connected perpendicularly to the side sills 20.

A rigidity reduction portion 110 is formed at the No. 4 cross member 29 near its connection portion 29b with each of the side sills 20 (see FIG. 1). The rigidity reduction portion 110 comprises recess portions 112c and 112d with arc-shaped cross section, which are formed at a front face 29c and a rear face 29d of the No. 4 cross member 29 and extend vertically respectively, and a recess portion 112e with arc-shaped cross section, which is formed at a lower face 29e of the No. 4 cross member 29 and extend longitudinally.

These recess portions 112c through 112e are connected such that the front recess portion 112c is continuous to the lower recess portion 112e and the lower recess portion 112e is continuous to the rear recess portion 112d. And, the second floor panel 4 is coupled to an upper face (flange) 29f of the No. 4 cross member 29. Herein, an illustration of the second floor panel 4 is omitted in FIG. 9B.

The rigidity reduction portion 110 is configured such that its rigidity in the vehicle width direction is lower than other portions of the No. 4 cross member 29. Thus, the vibration transmitted to the No. 4 cross member 29 from the side sill 20 is increased intensively at the rigidity reduction portion 110 (recess portion 112) and the vibration is suppressed from being transmitted in the vehicle width direction by the rigidity reduction portion 110, which will be described more in detail below. Also, an application-type damping material 116 is disposed intensively in the space of the recess portions 112c through 112e. This damping material 116 decreases the vibration intensively increased at these recess portions properly and suppresses the transmission of vibration from these recess portions inwardly. The specific gravity and hardness of the application-type of damping material is as described above. Herein, the asphalt-based damping material may be applied instead.

Next, as illustrated in FIG. 9A, the height of the No. 4 cross member 29 is becomes smaller near a connecting portion 29h with the side sill 20. Namely, the cross section of the portion 29h is narrower than the other portions and thereby the rigidity of the portion 29h is smaller than the other portions. Accordingly, the vibration transmission from the side sill 20 to the No. 4 cross member 29 is suppressed properly. Thus, the rigidity of the connecting portion of the No. 4 cross member 29 with the side sill 20 is configured so as to be smaller than the other connecting portions of the No. 3 cross member 28 with the side sill 20 and the floor side frame 22, by the rigidity reduction portion 110 and the portion 29h.

Figure 10A:
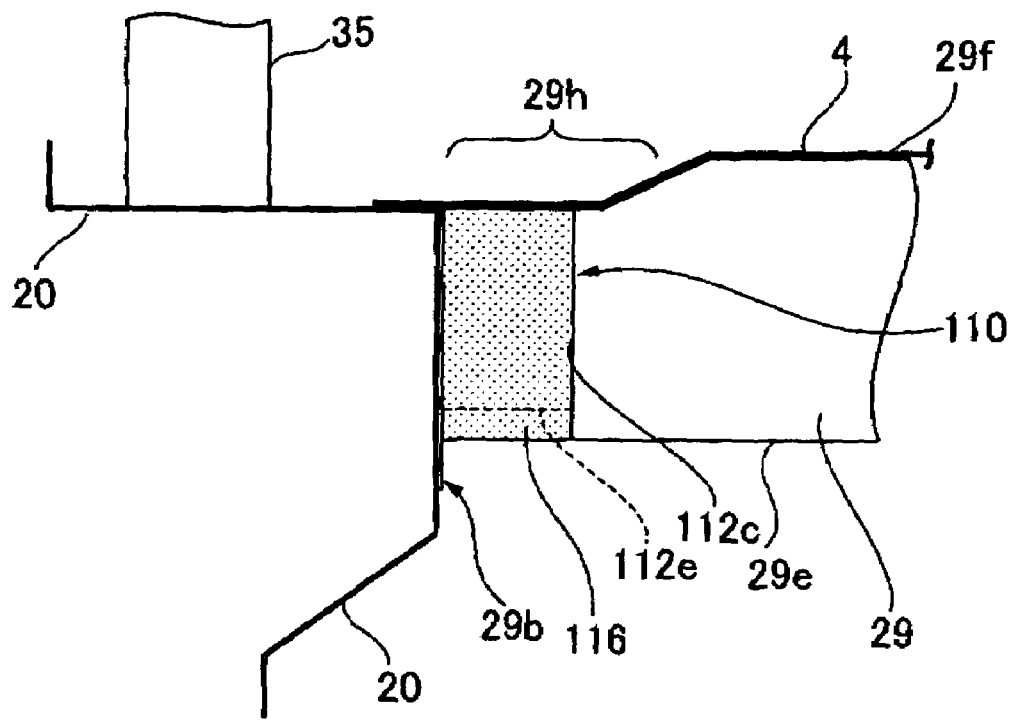
FIG. 10A is a partially enlarged elevation view of a modified No. 4 cross member along with the side sill and the pillar, viewed from the front of the vehicle, according to the fourth embodiment of the present invention.
Figure 10B:
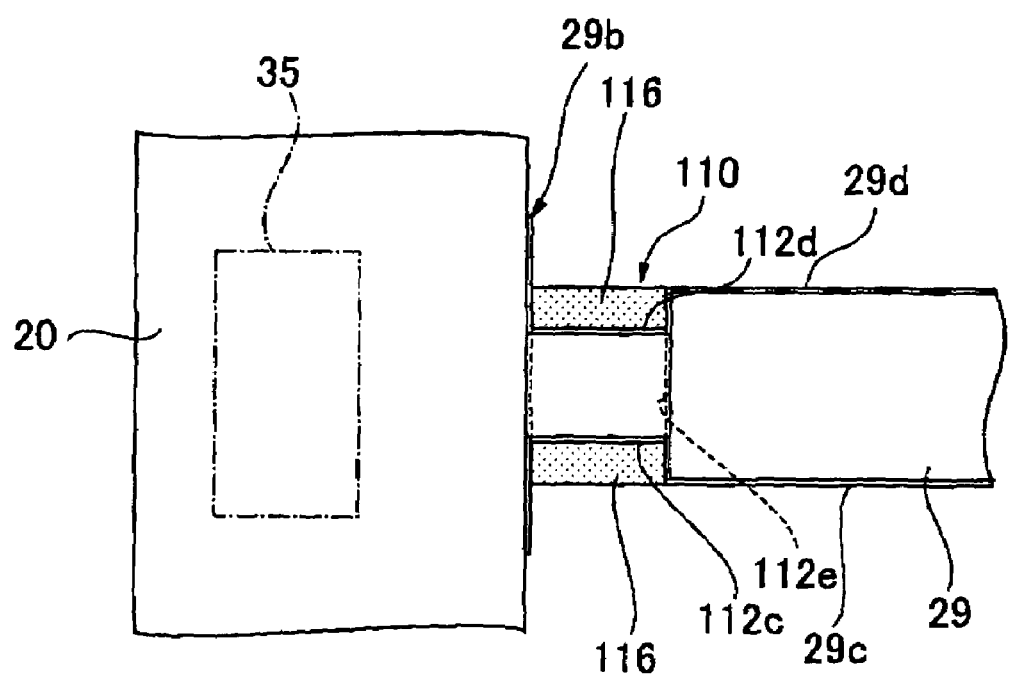
FIG. 10B is a partially enlarged plan view of them, viewed from above, according to the fourth embodiment of the present invention.

Further, as illustrated in FIGS. 10A and 10B, the width of the recess portions 112c through 112e of the rigidity reduction portion 110 may be made wider and the recess portions may contact the side sill 20 directly. In this modified example, the recess portions 112c through 112e have a U-shaped cross section. Thereby, the rigidity of the rigidity reduction portion 110 can be made more smaller.

Next, the cross section of the connecting portion 29a of the No. 4 cross member 29 with the floor side frame 22, not illustrated, is configured so as to be narrower than the other cross members, thereby suppressing the transmission of vibration from the floor side frame 22. Herein, the rigidity reduction portion 110 may be located near the connecting portion of the floor side frame 22 or at the other members.

Figure 11A:
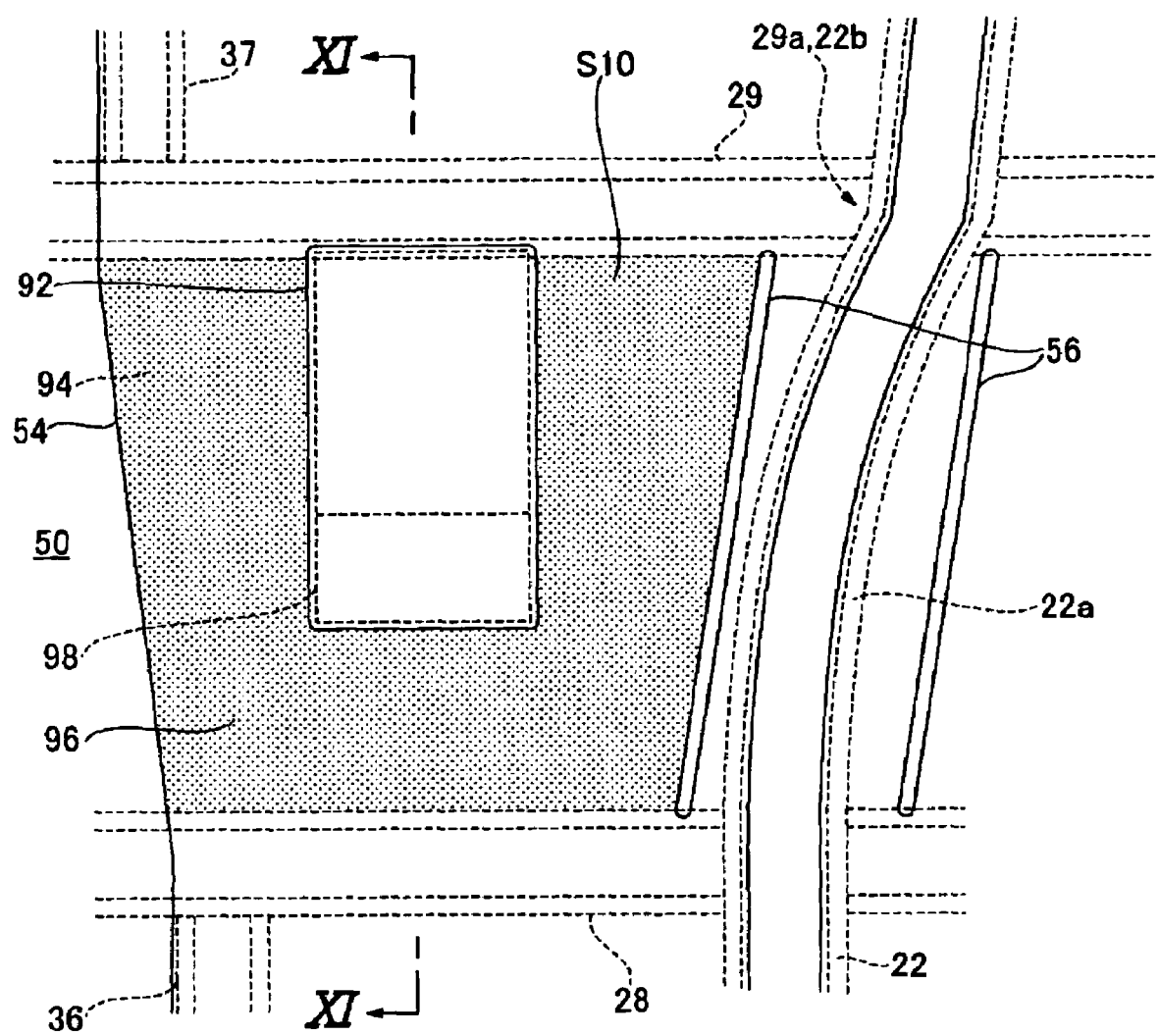
FIG. 11A is an enlarged plan view of the No. 4 cross member and a panel area S10 according to the fourth embodiment of the present invention.
Figure 11B:
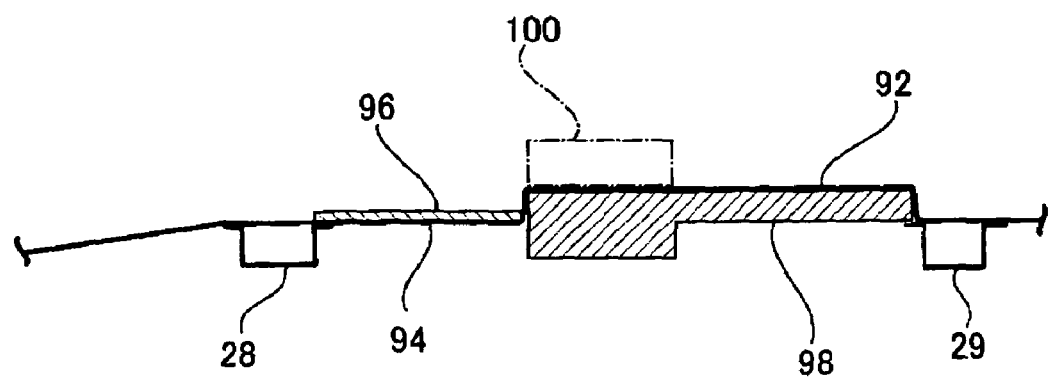
FIG. 11B is a sectional view taken along line XI-XI of FIG. 11A, illustrating a sectional structure of the No. 4 cross member and the panel area S10 in the longitudinal direction.
Figure 12A:
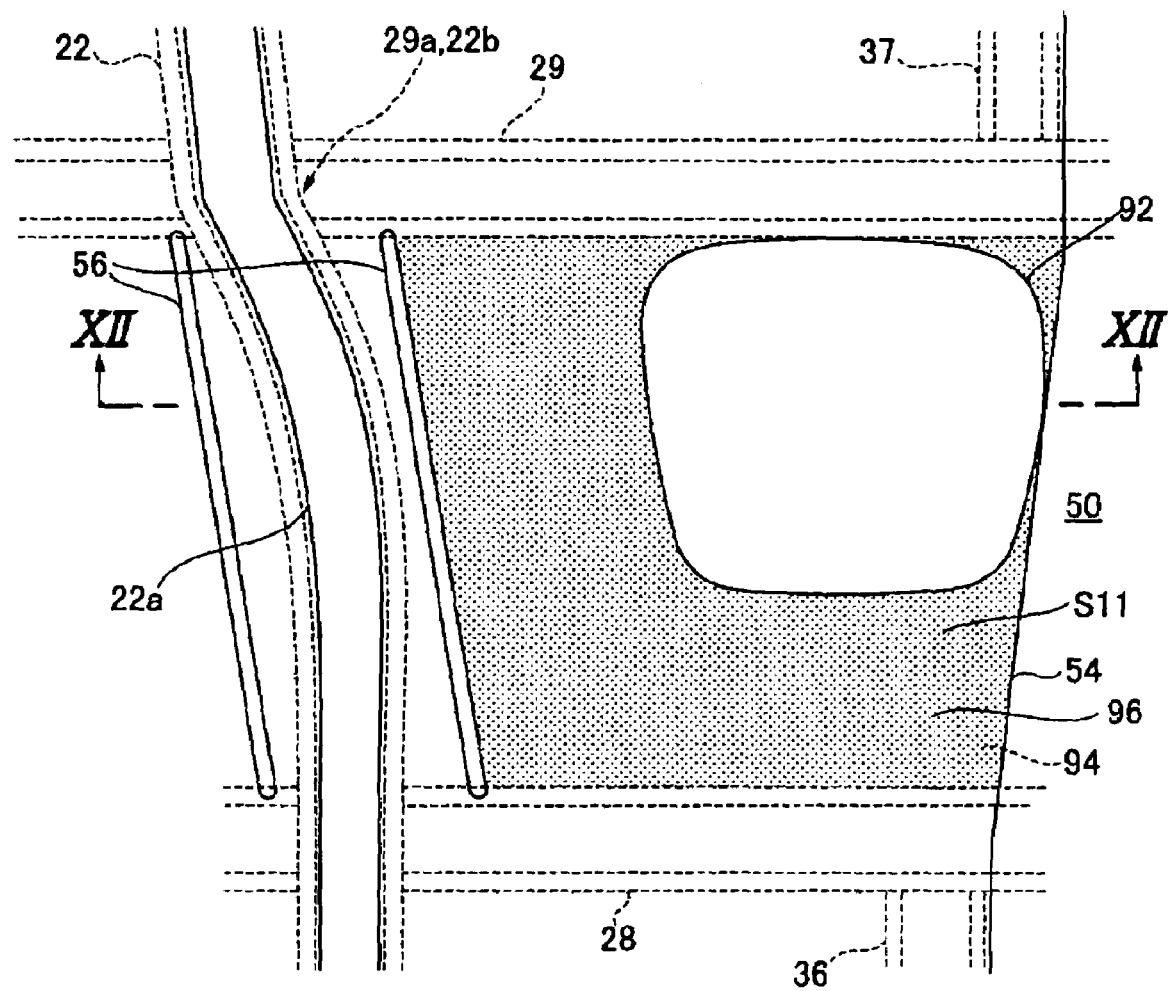
FIG. 12A is an enlarged plan view of the No. 4 cross member and a panel area S11 according to the fourth embodiment of the present invention.
Figure 12B:
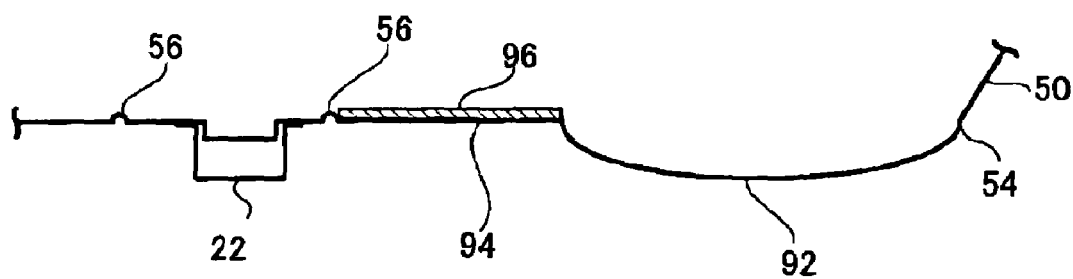
FIG. 12B is a sectional view taken along line XII-XII of FIG. 12A, illustrating a sectional structure of the panel area S11 in the vehicle width direction.

Next, the constitution and shape of the panel area S10 and S11 and the vibration reduction structure will be described specifically referring to FIGS. 1, 11A, 11B and 12A, 12B. FIG. 11A is an enlarged plan view of the No. 4 cross member and the panel area S10 according to the fourth embodiment of the present invention, and FIG. 11B is a sectional view taken along line XI-XI of FIG. 11A, illustrating the sectional structure of the No. 4 cross member and the panel area S10 in the longitudinal direction. FIG. 12A is an enlarged plan view of the No. 4 cross member and the panel area S11 according to the fourth embodiment of the present invention, and FIG. 12B is a sectional view taken along line XII-XII of FIG. 12A, illustrating the sectional structure of the panel area S11 in the vehicle width direction.

As illustrated in FIGS. 11A and 12A, the panel area S10 and S11 are formed in the substantially rectangular shape respectively by being enclosed by the frame members 28, 29, the bent line portion 54 and the bead 56 which extend substantially straight, and the No. 3 and No. 4 cross members 28 and 29 constitute a pair of parallel sides thereof. Herein, the bent line portion 54 and the bead 56 constitute the vibration restraint portion to control the vibration area of the panel area S10.

There are provided the substantially rectangular high-rigidity area 92 and the low-rigidity area 94 located around the high-rigidity area 92 within the panel area S10 as illustrated in FIG. 11A. As illustrated in FIG. 11B, the high-rigidity area 92 is formed so as to project upward and its cross section is formed in the substantially trapezoid shape. Meanwhile, the low-rigidity area 94 is formed in the substantially flat shape, and the above-described asphalt-based damping material 96 is provided on its entire area like the first and third embodiments.

As illustrated in FIG. 11A, the high-rigidity area 92 includes three straight-extending sides and one side contacting the No. 4 cross member 29. This No. 4 cross member 29 is configured such that the vibration transmission from the side sill 20 is suppressed by the above-described rigidity reduction portion 110. The low-rigidity area 94 is formed with the specified width so as not to increase the rigidity of the low-rigidity area 94 improperly like the above-described first through third embodiments.

Also, as illustrated in FIGS. 11A and 11B, the bracket 98 is disposed in the space which the upward-projecting high-rigidity area 92 creates, and the auxiliary component 100 is attached on the upper face of the high-rigidity area 92 via this bracket 98. The bracket 98 is coupled to the No. 4 cross member 29 at its one side. The high-rigidity area 92 with the auxiliary component 100 constitutes the heavy-weight area 92 like the above-described panel area S13 and S14.

Next, as illustrated in FIG. 12A, the substantially rectangular high-rigidity area 92 with the slightly curved sides is formed within the panel area S11. The rear side and the inside side of the high-rigidity area 92 contact the middle portions of the No. 4 cross member 29 and the bent line portion 54, respectively. Around the high-rigidity area 92 is provided the low-rigidity area 94 extending in the L shape, which has the specified width so as not to increase its rigidity improperly, like the above-described first through third embodiments.

As illustrated in FIG. 12B, the high-rigidity area 92 is formed so as to project downward and its cross section is formed in the dome shape. Herein, the high-rigidity area 92 may be formed so as to project upward. Meanwhile, the low-rigidity area 94 is formed in the substantially flat shape, and the asphalt-based damping material 96 is provided at the entire area of the low-rigidity area 94 like the above-described first through third embodiments.

Next, the function and effect of the fourth embodiment will be described. First, the function and effect of the rigidity reduction portion 110 at the No. 4 cross member 29 will be described. Since the rigidity reduction portion 110 which has its lower rigidity than the other portion is provided near the connecting portion 29a of the No. 4 cross member with the side sill 20 according to the present embodiment, the vibration transmitted from the side sill 20 to the No. 4 cross member 29 can be increased at the rigidity reduction portion 110 and the vibration can be prevented properly from being transmitted from this rigidity reduction portion 110 inwardly.

More specifically, where the side sill 20 generates its torsional vibration around a longitudinal axis or its bending vibration in the vertical or lateral directions, such vibration with the torsion or the bending is transmitted to the No. 4 cross member 29. The rigidity reduction portion 110 has its lower rigidity in the vehicle width direction compared with the other portions of the No. 4 cross member 29 as described above, and accordingly it tends to be deformed easily by such vibration with the torsion or bending. Thus, the vibration transmitted from the side sill 20 is increased at this easily-deformable rigidity reduction portion 110 and thereby the vibration from the side sill 20 can be prevented from being transmitted further inwardly from the rigidity reduction portion 110. As a result, the vibration, which will be transmitted to the panel area S10, S11, S13 and S14 via the No. 4 cross member 29, can be reduced properly, and thereby the acoustic emission generated from the floor panel can be reduced.

Figure 13A:
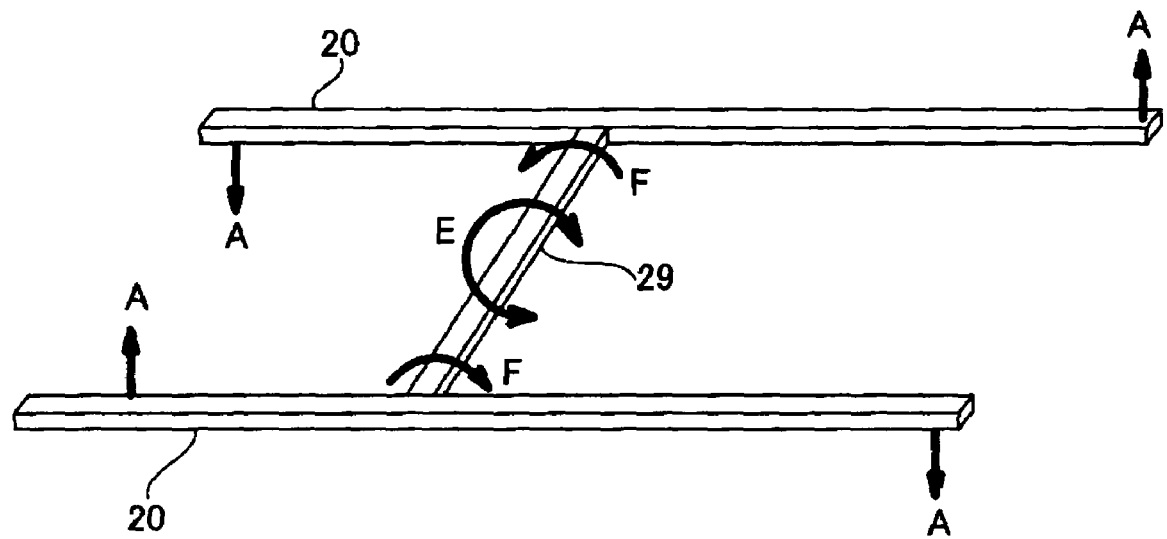
FIG. 13A is a schematic view of frame members for explaining the function of the fourth embodiment of the present invention.

Hereinafter, the function of the rigidity reduction portion 110 will be described more specifically referring to FIGS. 13A and 13B. First, the main function and effect of the recess portion 112e formed at the lower face 29e of the No. 4 cross member 29 will be described. As illustrated in FIG. 13A, where a force denoted by A in the figure is applied to the side sills 20 due to a pushing-up force of the suspension from the road surface or the like, the side sills 20 generate the bending vibration with vertically-curved deformation. Also, an entire upper body 122 of the vehicle body including the pillars 35 and a roof 120 generates the vibration with the torsional deformation (see FIG. 13B).

Figure 13B:
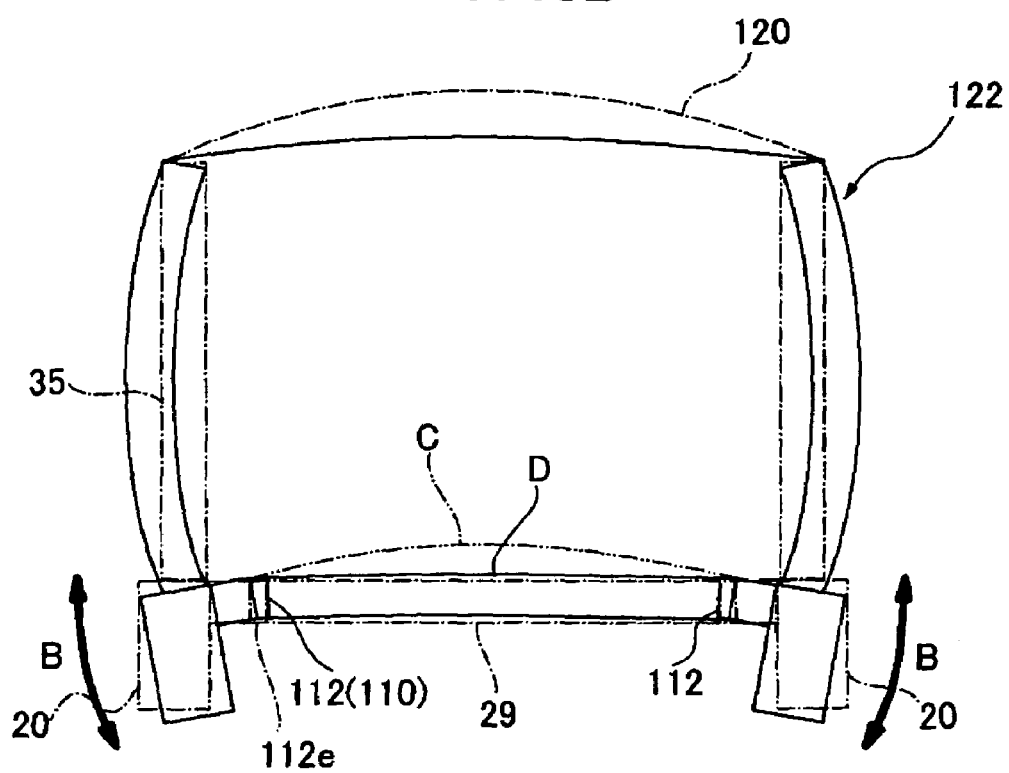
FIG. 13B is a schematic view illustrating a deformation state of the vehicle body structure including an upper body.

When the upper body 122 generate such vibration, the pillars 35 generates a vibration with a laterally-curved deformation as illustrated in FIG. 13B. This may be the same as a case where, for example, when a box with a closed cross section was twisted, the side face of the box would generate a bending deformation. Herein, since the pillars 35 are connected to the side sills 20, the side sills 20 generate the vibration with the laterally-inclining deformation as illustrated by B in the drawing. Thereby, the No. 4 cross member 29 generates a vibration with bending deformation as illustrated by a broken line C. This vibration causing the bending deformation is increased intensively at the rigidity reduction portion 110, and particularly the recess portion 112e formed at the lower face 29e of the rigidity reduction portion 110 deforms greatly. As a result, the vibration which will be transmitted from the rigidity reduction portion 110 inwardly is reduced, and thereby the bending vibration is reduced as illustrated by a solid line D.

Particularly, since the rigidity reduction portion 110 is formed at the No. 4 cross member 29 which is coupled to the side sills 20, the vibration can be prevented effectively from being transmitted to the No. 4 cross member inwardly where the side sills 20 would generate the torsional vibration with the laterally-inclining deformation due to the bending vibration of the pillars 35 caused by the torsional vibration of the upper body 122. Meanwhile, since the no rigidity reduction portion is provided at the other cross members, such as the No. 3 cross member 28, the sufficiently large rigidity of the vehicle body can be ensured.

Next, the main function and effect of the recess portions 112c and 112d formed at the front and rear feces of the No. 4 cross member 29 will be described. For example, the side sills 20 generates the vibration with laterally-curved deformation when a side force is applied to the suspension from the road surface. This vibration causes the No. 4 cross member 13A to generate a vibration with the bending deformation as illustrated by E in FIG. 13A. This vibration causing the bending deformation is increased intensively at the rigidity reduction portion 110, and particularly the recess portion 112c and 112d formed at the front and rear faces 29c and 29d of the rigidity reduction portion 110 deform greatly. As a result, the vibration which will be transmitted from the rigidity reduction portion 110 inwardly is reduced.

Next, the function and effect of the recess portions 112c through 112e of the rigidity reduction portion 110 will be described. Where the side sills 20 generate the bending vibration with vertically-curved deformation by the force A illustrated in the figure, there occurs the vibration causing the torsional deformation of the No. 4 cross member 29 illustrated by F in FIG. 13A. This vibration causing the torsional deformation is increased intensively at the rigidity reduction portion 110, and the recess portion 112c through 112d deform so as to be uniformly twisted. As a result, the vibration which will be transmitted from the rigidity reduction portion 110 inwardly is reduced.

Next, the function and effect of the damping material 116 provided at the rigidity reduction portion 110 will be described. Sine the damping material 116 is intensively disposed in the space with the arc-shaped cross section of the recess portions 112 in the present embodiment, the vibration intensively increased at the recess portions 112 can be decreased. As a result, the vibration can be prevented from being transmitted from the recess portions 112 inwardly.

Next, the function and effect of the modified example of the rigidity reduction portion 110 will be described. Since the width of the recess portions 112 of the example illustrated in FIGS. 10A, 10B is greater, the rigidity in the vehicle width direction can be smaller further. As a result, the great vibration can be prevented from being transmitted inwardly surely. Also, since the recess portions 112 of the modified example are formed contacting the side sills 20, the vibration with various deformations, such as bending and torsional deformations, can be increased intensively at the recess portions 112 more surely. Further, since the recess portions 112 have the U-shaped cross section, its rigidity can be made further smaller.

As described above, according to the present embodiment and the modified example, regardless of the above-described limitations in vehicle-body structure, such as height, locations, size and the like, or manufacturing, the vibration energy at the panel area can be reduced effectively by providing the rigidity reduction portion at the frame member and the like. For example, providing the rigidity reduction portion at the frame member can reduce the vibration transmitted to the floor panels, without having any interference with objects, such as the exhaust pipe and auxiliary components, and with its appropriate height which can provide the passengers with comfortable stepping.

Next, the function and effect of the vibration reduction structure at the panel area S10 and S11 will be described. According to the present embodiment, the rigidity reduction portion 110, as the vibration transmission reduction structure, is provided at the frame member 29 to reduce the vibration transmitted to the panel area, and the high-rigidity area 92 and the low-rigidity area 94, as the vibration reduction structure, are provided within the panel area S10 and S11 to reduce the acoustic emission generated from the floor area S10 and S11.

Since the one side of the high-rigidity area 92 contacts the No. 4 cross member 29 at the panel area S10 and two sides of the high-rigidity area 92 contact the No. 4 cross member 29 and the bent line portion 54 at the panel area S11, the rigidity of the respective high-rigidity area 92 can be increased greatly and thereby the rigidity difference between the high-rigidity area 92 and the low-rigidity area 94 can be further increased. Accordingly, even where the rigidity of the panel area itself is relatively high due to its relatively small area, the difference in rigidity between them can be ensured greatly. Thus, the vibration energy can be increased intensively at the low-rigidity area. Further, the increasing of the vibration energy at the low-rigidity area can be furthered at the panel area S10 by the increased difference in weight between the both area with the bracket 98 and the auxiliary component 100.

Further, since the vibration transmission from the side sills is suppressed properly at the No. 4 cross member 29 the respective high-rigidity area 92 contact as described above, the great vibration can be prevented from being transmitted to the panel area S10 and S11. As a result, the acoustic emission caused by the vibration transmitted to the panel area S10 and S11 from the No. 4 cross member 29 can be reduced, and the vibration reduction effect can be obtained surely by increasing the rigidity of the high-rigidity area 92 properly. Accordingly, regardless of the above-described limitations in vehicle-body structure, such as height, locations, size and the like, or manufacturing, the vibration energy at the panel area can be reduced effectively by the increased rigidity of the heavy-weight area contacting the cross members.

The present invention should not be limited to the above-described embodiments, but any other modifications and improvements may be applied within the scope of a sprit of the present invention.

What is claimed is:

1. A floor panel structure of a vehicle body, in which a floor of an automotive vehicle is formed by a floor panel coupled to a plurality of frame members which extend in substantially longitudinal and width directions of the vehicle, comprising:
   a panel area provided at said floor panel, said panel area being formed by being enclosed at least by said frame members,
   a heavy-weight area formed within said panel area, said heavy-weight area comprising an application-type of damping material which is provided at the substantially central portion of said panel area, and an asphalt-based damping material is provided at a peripheral area formed within said panel area, having a lower hardness and a greater specific gravity than that of said application-type of damping material provided at said heavy-weight area, the heavy-weight area being located at a substantially central portion of said panel area, and the peripheral area being located substantially around said heavy-weight area,
   wherein said heavy-weight area is configured so as to be heavier than said peripheral area.

2. The floor panel structure of claim 1, wherein said application-type of damping material is thicker than said asphalt-based damping material.

* * * * *